(12) United States Patent
Nishimoto

(10) Patent No.: US 7,845,453 B2
(45) Date of Patent: Dec. 7, 2010

(54) TRANSAXLE PROVIDED WITH POWER TAKE-OFF DEVICE

(75) Inventor: Shuji Nishimoto, Amagasaki (JP)

(73) Assignee: Kanzaki Kokyukoki Mfg. Co., Ltd., Hyogo (JP)

(*) Notice: Subject to any disclaimer, the term of this patent is extended or adjusted under 35 U.S.C. 154(b) by 89 days.

(21) Appl. No.: 12/233,020

(22) Filed: Sep. 18, 2008

(65) Prior Publication Data

US 2009/0078083 A1 Mar. 26, 2009

(30) Foreign Application Priority Data

Sep. 21, 2007 (JP) .............................. 2007-245017

(51) Int. Cl.
*B60K 17/34* (2006.01)
(52) U.S. Cl. .................. 180/233; 180/252; 180/337
(58) Field of Classification Search ............... 180/233, 180/252, 337
See application file for complete search history.

(56) References Cited

U.S. PATENT DOCUMENTS

2010/0050625 A1* 3/2010 Iida et al. .................... 60/435

2010/0120580 A1* 5/2010 Mepham et al. ................ 477/3

FOREIGN PATENT DOCUMENTS

JP 2005-297673 10/2005

* cited by examiner

*Primary Examiner*—Lesley Morris
*Assistant Examiner*—Tashiana Adams
(74) *Attorney, Agent, or Firm*—Sterne, Kessler, Goldstein & Fox P.L.L.C.

(57) ABSTRACT

A power take-off support portion, including a shaft hole and an outer side surface formed around the shaft hole, is formed on a transaxle housing. The outer side surface of the power take-off support portion is shaped to fit a power take-off casing supporting a power take-off shaft in a first direction. A power take-off casing includes a power take-off main casing member and a base casing member joined to each other. The base casing member is formed with an inner side surface and an outer side surface. The inner side surface and the outer side surface of the base casing member are shaped so that the power take-off shaft supported by the power take-off main casing member is oriented in a second direction different from the first direction when the inner side surface of the base casing member is fitted to the outer side surface of the power take-off support portion, and the outer side surface of the base casing member is fitted to the inner side surface of the power take-off main casing member.

7 Claims, 17 Drawing Sheets

TRANSAXLE PROVIDED WITH POWER TAKE-OFF DEVICE

BACKGROUND OF THE INVENTION

1. Field of the Invention

The present invention relates to a transaxle provided with a power take-off (hereinafter, "PTO") device for transmitting power from a transmission in the transaxle. In one embodiment, the transaxle is available to a four-wheel driving vehicle such as a utility vehicle, and the power take-off device is adapted for transmitting power to another transaxle.

2. Related Art

As disclosed in Japanese Laid-Open Gazette No. 2005-297673, there exists a well-known and conventional four-wheel drive vehicle. In the vehicle, a first transaxle is provided for driving two wheels at either the front or rear portion of the vehicle, and a second transaxle is provided for driving two wheels at the other portion of the vehicle. The first transaxle is provided with an input portion on one of right and left sides thereof, and is provided with a PTO shaft on the other of right and left sides thereof laterally opposite to the input portion. A prime mover is arranged between the first and second transaxles. A transmission such as a continuously variable transmission (CVT) is extended from the prime mover and is drivingly connected to the input portion of the first transaxle driven by the transmission. A power train is extended from the PTO shaft laterally opposite to the transmission with respect to the first transaxle, while being laterally offset from the prime mover, and is drivingly connected to an input portion of the second transaxle.

In the conventional power train between the PTO shaft of the first transaxle and the input portion of the second transaxle, a PTO casing incorporating a start element of the power train for receiving power from the PTO shaft is disposed to face the PTO shaft. The PTO casing is separate from the first transaxle, and is mounted to a vehicle frame. This arrangement of the PTO casing is convenient for ensuring flexibility in the direction of the power train extended from the PTO casing. For example, if the input portion of the second transaxle is lower than the PTO shaft, the PTO casing may be supported slantwise by the vehicle frame so as to extend the power train forwardly downward, as disclosed in the above reference. However, such a PTO casing is disadvantageous in minimization of the vehicle and in facilitation of mounting thereof. Further, the PTO shaft during rotation transmits undesirable vibration to the PTO casing so as to undesirably vibrate the vehicle frame.

It should be considered that the referenced PTO casing is mounted integrally on a transaxle housing of the first transaxle. However, while the first transaxle can be easily standardized, it is difficult to standardize the power take-off casing because it should be disposed or shaped considering the positional relation between the PTO shaft of the first transaxle and the input portion of the second transaxle. For example, if the PTO shaft is higher than the input portion of the second transaxle, the PTO casing having an input part for receiving power from the PTO shaft as high as the PTO shaft should be considered in arrangement or shape for transmitting power to the lower input portion of the second transaxle. The difficulty in standardization of the PTO casing hinders economization of the vehicle.

SUMMARY OF THE INVENTION

An object of the invention is to provide a transaxle provided with a power take-off device improved in standardization.

To achieve this object, a transaxle according to the invention comprises: a transaxle housing incorporating a transmission for driving an axle; a power take-off support portion formed on the transaxle housing, the power take-off support portion including a shaft hole and an outer side surface formed around the shaft hole, wherein the outer side surface of the power take-off support portion is shaped to fit a power take-off casing supporting a power take-off shaft in a first direction; and a shaft of the transmission projecting outward from the shaft hole. A power take-off casing includes a power take-off main casing member and a base casing member joined to each other. The power take-off main casing member is assembled therein with a power take-off shaft and a power take-off transmission mechanism drivingly connected to the power take-off shaft. The base casing member is interposed between the power take-off support portion and the power take-off main casing member so as to pass through the shaft projecting from the shaft hole and to drivingly connect an end of the shaft to the power take-off transmission mechanism in the power take-off main casing member. The base casing member is formed with an inner side surface for fitting the outer side surface of the power take-off support portion, and with an outer side surface for fitting an inner side surface of the power take-off main casing member. The inner side surface and the outer side surface of the base casing member are shaped so that the power take-off shaft supported by the power take-off main casing member is oriented in a second direction different from the first direction when the inner side surface of the base casing member is fitted to the outer side surface of the power take-off support portion, and the outer side surface of the base casing member is fitted to the inner side surface of the power take-off main casing member.

Therefore, a power take-off device including the power take-off casing with the power take-off shaft and the power take-off transmission mechanism is integrated with the transaxle while ensuring the power take-off shaft extended in the second direction that is different from the first direction that is essentially intended as the extension direction of the power take-off shaft in forming the power take-off support portion of the transaxle housing. As a result, a main part of the power take-off device, i.e., the power take-off main casing member with the power take-off shaft and the power take-off transmission mechanism assembled therein can be provided as a standardized unit. On the other hand, the orientation of the power take-off shaft in the second direction different from the intended first direction depends on the shapes of the inner and outer side surfaces of the base casing member, however, the base casing member can be easily and simply shaped to have these surfaces because it is small and simple in comparison with the power take-off main casing member, which must incorporate the complex power take-off transmission mechanism. As a result, processes and costs for manufacturing the transaxle provided with a power take-off device can be reduced.

Preferably, the first direction is horizontal, and the second direction is slanted with respect to the horizontal direction. Therefore, even if the power take-off support portion of the transaxle housing is formed to support a horizontal power take-off shaft, the inner side surface of the base casing member is fitted to the outer side surface of the power take-off support portion essentially formed for supporting a horizontal power take-off shaft, and the outer side surface of the base casing member adapted to support a slanted power take-off shaft is fitted to the inner side surface of the power take-off main casing member supporting the power take-off shaft. As a result, the power take-off shaft supported by the power take-off main casing member mounted on the transaxle housing through the base casing member is extended slantwise with respect to the horizontal direction.

Preferably, one or more holes opened on the outer side surface of the power take-off support portion are coincided to one or more holes opened on the inner side surface of the base casing member respectively, and one or more fasteners are passed through the mutually coinciding holes respectively, so as to fasten the base casing member to the power take-off support portion. Such a simple and usual manner is adapted to fix the base casing member to the power take-off support portion so as to reduce costs.

Further, the one or more fasteners are hidden by the power take-off main casing member so as not to be exposed when the power take-off main casing member is mounted to the base casing member by fitting the inner side surface of the power take-off casing member to the outer side surface of the base casing member. In this way, the fasteners are prevented from being exposed, thereby being protected from dust and rainwater, and improving the power take-off casing in appearance.

Preferably, the power take-off gear mechanism includes mutually meshing first and second gears, the base casing member supports the first gear, and the power take-off main casing member supports the second gear so that the second gear meshes with the first gear when the power take-off main casing member is mounted on the base casing member by fitting the inner side surface of the power take-off main casing member to the outer side surface of the base casing member.

Therefore, only by removing the power take-off main casing member from the base casing member, the second gear can be easily separated from the first gear, thereby facilitating maintenance and adjustment of backlash between the first and second gears.

Preferably, a vehicle will be equipped with the above-mentioned transaxle. The transaxle is provided with an input part of the transmission therein on a surface of the transaxle housing opposite to the side surface formed with the power take-off support portion, so that the input part of the transmission in the transaxle housing is drivingly connected to a prime mover output part on one side of a prime mover through another transmission upstream of the transmission in the transaxle housing, and wherein a power train is extended from the power take-off shaft on the other side of the prime mover.

Therefore, the other transmission for driving the transmission in the transaxle housing and the power train extended from the power take-off shaft are distributed leftward and rightward from the prime mover to be prevented from interfering with each other.

Preferably, in the vehicle, a second transaxle will be disposed opposite to the transaxle with respect to the prime mover. The power train is drivingly connected to an input part of the second transaxle.

Therefore, the power train transmits power from the transmission in the first transaxle to the second transaxle, whereby the vehicle travels due to respective drive wheels driven by the first and second transaxles.

These, other and further objects, features and advantages of the invention will appear more fully from the following description with reference to accompanying drawings.

DETAILED DESCRIPTION OF THE INVENTION

Figure 1:
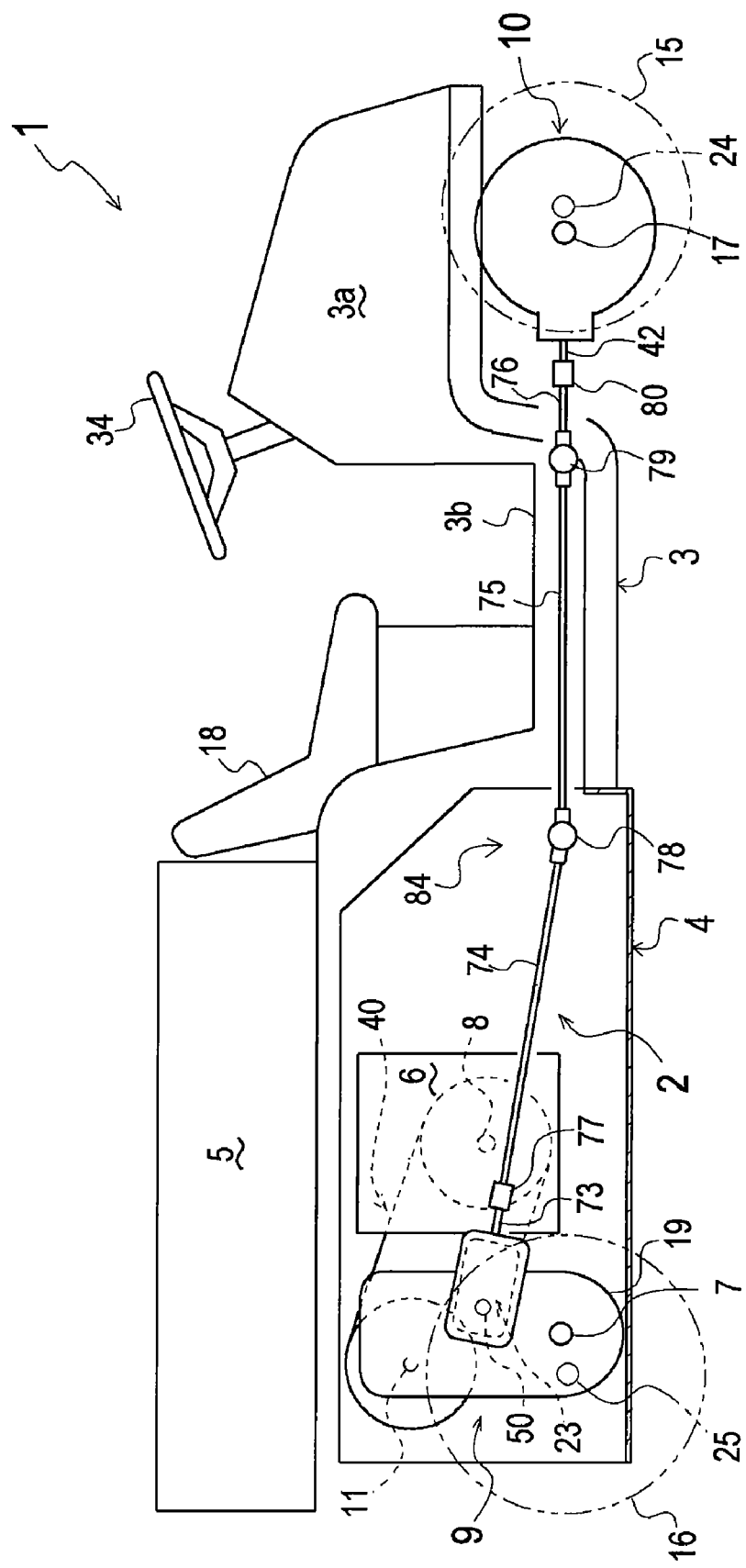
FIG. 1 is a side view of an entire four-wheel drive vehicle equipped with a transaxle according to the present invention.

An entire structure of a utility vehicle 1 serving as a vehicle equipped with a four-wheel driving power transmission system 2 will be described with reference to FIGS. 1 and 2. A front frame 3 and a rear frame 4 constitute the body of vehicle 1. Rear frame 4 includes a horizontal floorboard that is substantially rectangular when viewed in plan. Rear frame 4 also includes vertical side plates erected on front, rear, right and left ends of the floorboard. A cargo deck 5 is vertically rotatably mounted on the top of rear frame 4.

An engine 6 having a lateral horizontal crankshaft is mounted on the floorboard of rear frame 4 so as to serve as a prime mover. Engine 6 has a laterally (leftward in this embodiment) projecting engine output shaft 8. A rear transaxle 9 is supported by rear frame 4 behind engine 6. Rear transaxle 9 has a horizontal input shaft 11 projecting laterally (leftward in this embodiment) so as to be disposed in parallel to engine output shaft 8. A belt type continuously variable transmission (CVT) 40 is interposed between engine output shaft 8 and input shaft 11 of rear transaxle 9.

Rear transaxle 9 includes a transaxle housing 19 formed by joining left and right housing halves 20 and 21 to each other. Input shaft 11 projects leftward from transaxle housing 19. Transaxle housing 19 incorporates a transmission for driving right and left rear wheels 16, i.e., a reverser 14 and a differential gear unit 22. Reverser 14 selectively changes the rotary force of input shaft 11 into either a forward-traveling rotary force or a backward-traveling rotary force, and transmits the selected forward-traveling or backward-traveling rotary force to differential gear unit 22. Differential gear unit 22 differentially connects right and left differential output shafts 7 to each other.

Right and left differential output shafts 7 are journalled by transaxle housing 19 (i.e., respective right and left housing halves 21 and 20) and project laterally outward from transaxle housing 19 (i.e., respective right and left housing halves 21 and 20). Right and left extension shafts 36 are extended coaxially outward from respective distal ends of right and left differential output shafts 7 through respective coupling sleeves 35. Right and left rear wheels 16 are disposed on the outside of respective right and left sides of rear frame 4. Each rear wheel 16 has a central axial axle 25 which is connected to each of right and left extension shafts 36 through a propeller shaft 38 and universal joints 37 and 39.

A front transaxle 10 for driving right and left front wheels 15 is supported by a lateral middle under portion of front frame 3. Front transaxle 10 includes a transaxle housing 41. An input shaft 42 projects rearward from a rear end of transaxle housing 41, and is drivingly connected through a power train 84 to a power take-off (PTO) shaft 73 projecting from a later-discussed power take-off (PTO) casing mounted on rear transaxle 9. Four-wheel driving power transmission system 2, including PTO shaft 73 and power train 84, is defined as a power transmission system for transmitting power from rear transaxle 9 to front transaxle 10, whose leading terminal (most upstream portion) is put in the PTO casing, and whose last terminal (most downstream portion) is regarded as input shaft 42 of front transaxle 10.

Power train 84 includes a later-discussed third propeller shaft 76 which is coaxially joined at a front end thereof to input shaft 42 through a coupler 80. A differential gear unit 44 for differentially driving right and left front wheels 15 is disposed in transaxle housing 41. Differential gear unit 44 includes a bevel input gear 45 which meshes with a bevel gear 43 on input shaft 42 in transaxle housing 41 so as to receive power taken off from rear transaxle 9. Differential gear unit 44 includes a differential casing 46 on which input gear 45 is fixed. A pinion shaft 48 is integrally rotatably supported in differential casing 46, and bevel pinions 47 are pivoted on pinion shaft 48 in differential casing 46. Right and left differential output shafts 17 are rotatably supported by right and left portions of transaxle housing 41, and are inserted at proximal ends thereof into differential casing 46. Differential side gears 49 are fixed on the proximal ends of respective front differential output shafts 17, and mesh with pinions 47, thereby differentially connecting right and left differential output shafts 17 to each other.

Right and left differential output shafts 17 project laterally outward from respective right and left ends of transaxle housing 41. Each differential output shaft 17 is drivingly connected to a central axial axle 24 of each of right and left front wheels 15 through a propeller shaft 27 and universal joints 26 and 28. Therefore, differential gear unit 44 of front transaxle 10 transmits power from rear transaxle 9 to right and left front wheels 15.

Right and left front wheels 15 are steerable wheels, which are steerably suspended by right and left side portions of front frame 3 through respective suspensions such as coiled springs or shock absorbers. A front cover 3a is mounted on a front portion of front frame 3 above front wheels 15 and front transaxle 10, and a platform 3b is provided on a rear portion of front frame 3 behind front cover 3a, front wheels 15 and front transaxle 10. An instrumental panel, operation tools and a steering wheel 34 are disposed on an upper portion of front cover 3a. A driver's seat 18 is mounted on a rear end portion of front frame 3 so that platform 3b is spread on front, right and left sides of seat 18.

Rear transaxle 9 will be described with reference to FIGS. 1 to 6. In transaxle housing 19 of rear transaxle 9, input shaft 11, a reversing shaft 51, a counter shaft 50, and right and left differential output shafts 7 are supported and are laterally horizontally extended. Left and right housing halves 20 and 21 joined to form housing 19 are provided at laterally distal ends thereof with respective openings 20b and 21b. Lids 119 and 120 are provided to cover respective openings 20b and 21b and to rotatably support respective differential output shafts 7 through respective bearings 121 therein. Lids 119 and 120 are detachable for assembling and dissembling of differential output shafts 7.

In transaxle housing 19, input shaft 11 is fixedly provided (or formed) thereon with a forward-traveling driving gear 52 and a backward-traveling driving gear 53. A doubled counter gear 55 includes large and small diameter gears 55a and gear 55b which are rotatable integrally with each other, and counter gear 55 is relatively rotatably provided on reversing shaft 51. Further, a forward-traveling driven gear 56 and a backward-traveling driven gear 57 are relatively rotatably fitted on counter shaft 50. Forward-traveling driving gear 52 and forward-traveling driven gear 56 directly mesh with each other so as to serve as a forward-traveling gear train. Backward-traveling driving gear 53 meshes with large diameter gear 55a, and backward-traveling driven gear 57 meshes with small diameter gear 55b, so that gears 53, 55a, 55b and 57 constitute a backward-traveling gear train.

A spline hub 58 is fixed on counter shaft 50 between driven gears 56 and 57, and a shifter 58a is axially slidably and relatively unrotatably spline-fitted on spline hub 58. Forward-traveling driven gear 56 and backward-traveling driven gear 57 are formed integrally with respective clutch-teeth 56a and 57a facing to spline hub 58. A fork 59 is engaged on shifter 58a. A reversing operation device (not shown) is provided on vehicle 1, for example, on a rear end of front cover 3a or beside seat 18. The reversing operation device is linked to fork 59, so that, by operating the reversing operation device, fork 59 is moved to axially slide shifter 58a on spline hub 58.

When shifter 58a meshes with clutch-teeth 56a, forward-traveling driven gear 56 is relatively unrotatably fitted to counter shaft 50 so as to select the forward-traveling gear train to be activated for forward traveling of vehicle 1. When shifter 58a meshes with clutch-teeth 57a, backward-traveling driven gear 57 is relatively unrotatably fitted to counter shaft 50 so as to select the backward-traveling gear train to be activated for backward traveling of vehicle 1. Shifter 58a may be able to be separated from both clutch-teeth 56a and 57a so as to set vehicle 1 in a neutral state. Alternatively, the gear train including gears 52 and 56 may serve as a backward-traveling gear train, and the gear train including gears 53, 55a, 55b and 57 may serve as a forward-traveling gear train.

An output gear 60 is fixed (or formed) on counter shaft 50 and meshes with an input gear 61 of differential gear unit 22. Differential gear unit 22 includes a differential casing 62 on which input gear 61 is fixed. A pinion shaft 64 is integrally rotatably supported in differential casing 62, and bevel pinions 63 are pivoted on pinion shaft 64 in differential casing 62. Right and left differential output shafts 7 are inserted at proximal ends thereof into differential casing 62. Differential side gears 66 are fixed on the proximal ends of respective rear differential output shafts 7, and mesh with pinions 63, thereby differentially connecting right and left differential output shafts 7 to each other.

Differential gear unit 22 is provided with a differential lock mechanism 67. Differential lock mechanism 67 includes a differential lock slider 69 axially slidably and relatively unrotatably fitted on one axial end boss portion 62a of differential casing 62. Lock pins 70 are fixed at one ends thereof to differential lock slider 69, and are extended at the other ends thereof toward respective engagement holes 66a of differential side gear 66. A fork 68 is fitted on differential lock slider 69, and is operatively connected to a differential lock operation device (not shown) provided on vehicle 1. When the differential lock operation device is operated for differential locking of differential gear unit 22, fork 68 and differential lock slider 69 are slid to insert the other ends of lock pins 70 into engagement holes 66a so as to lock differential side gear 66 to differential casing 62, thereby differentially locking right and left differential output shafts 7, i.e., right and left rear wheels 16, to each other.

A side wall of housing half 21 is formed integrally with a power take-off (PTO) support portion 21a. PTO support portion 21a includes a shaft hole 21c in which a bearing 83 is fitted and supports counter shaft 50 therethrough. Counter shaft 50 projects outward from shaft hole 21c, i.e., from PTO support portion 21a of transaxle housing 19 through bearing 83 so as to be drivingly connected to a power take-off (PTO) gear transmission mechanism 23 in a later-discussed power take-off (PTO) casing mounted on PTO support portion 21a.

Four-wheel driving power transmission system 2, including PTO gear transmission mechanism 23 in the PTO casing according to a first embodiment, and including power train 84, will be described with reference to FIGS. 1 to 12.

Figure 2:
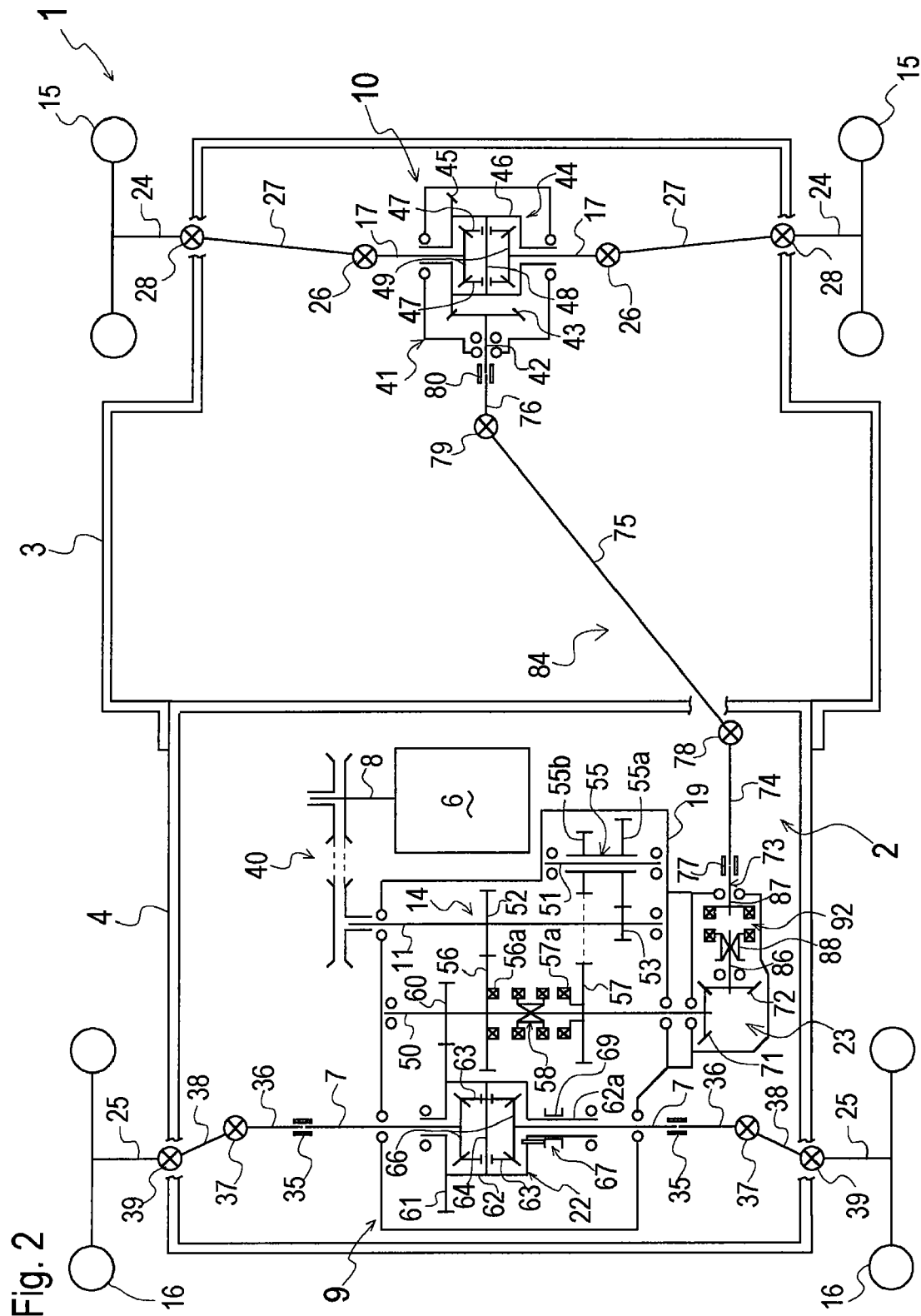
FIG. 2 is a schematic plan view of the four-wheel drive vehicle.
Figure 4:
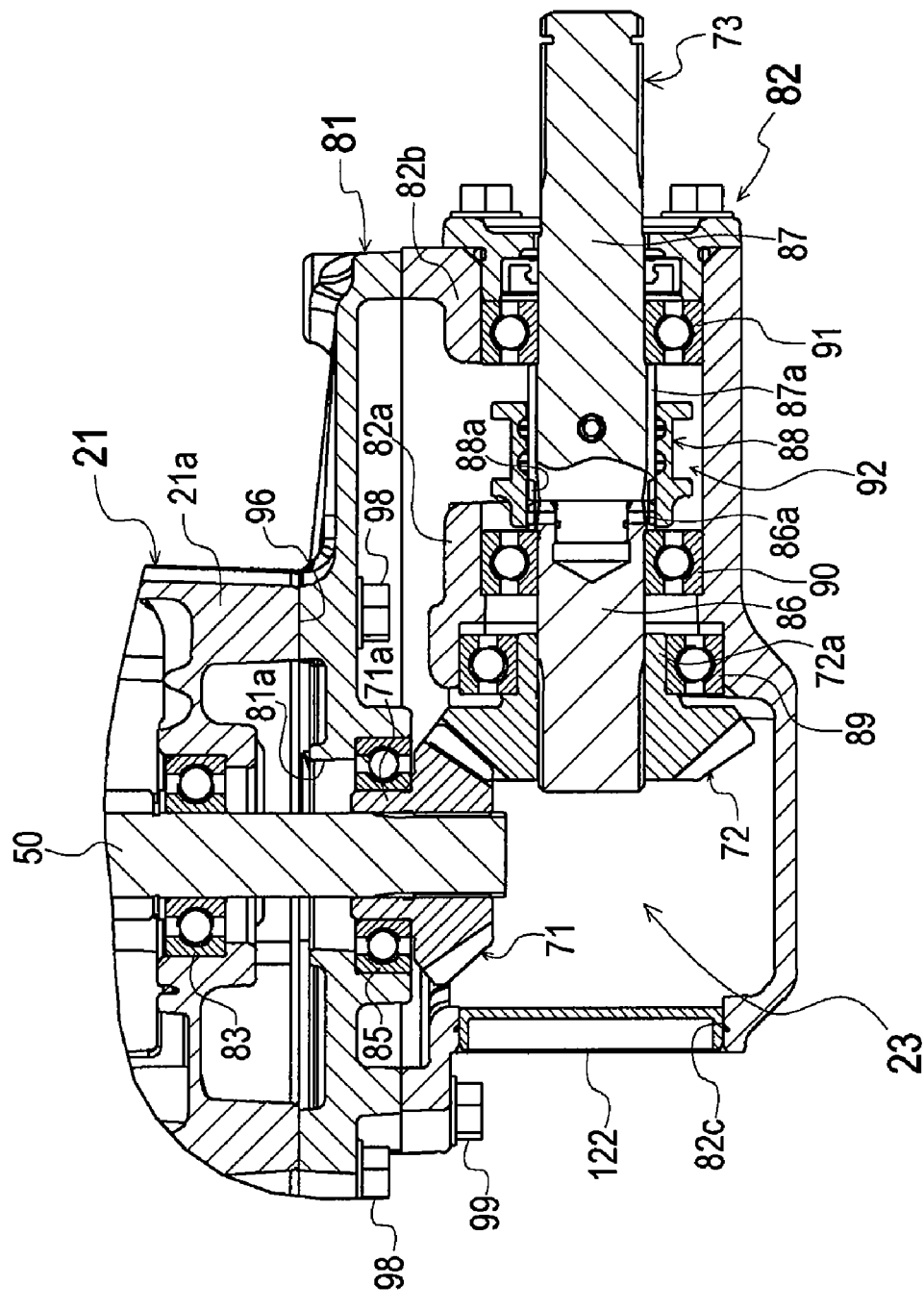
FIG. 4 is a cross sectional view taken along A-A line of FIG. 3.
Figure 5:
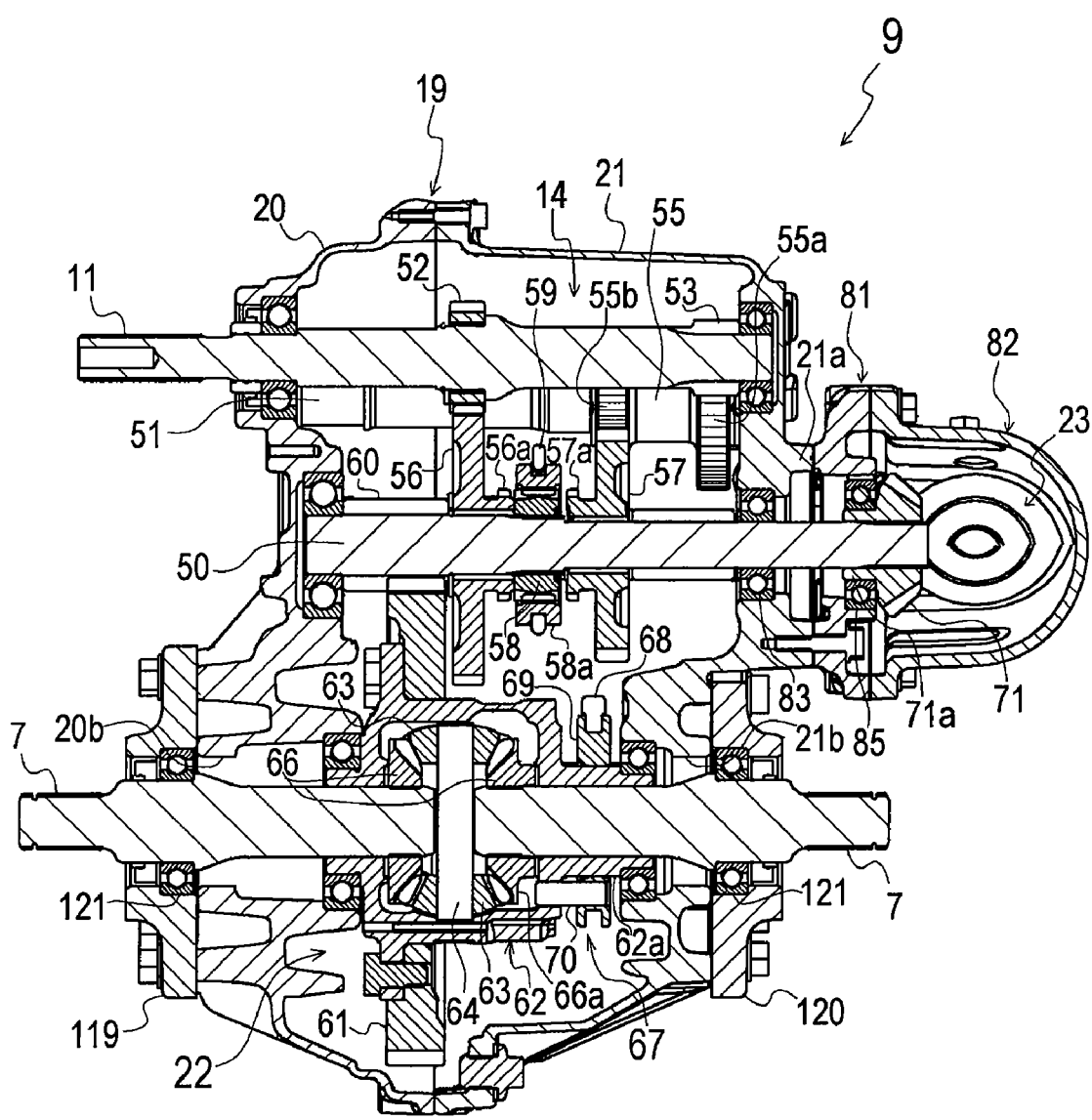
FIG. 5 is a cross sectional view taken along B-B line of FIG. 3.

As shown in FIGS. 1, 2 and 4, power train 84, interposed between PTO shaft 73 supported by the PTO casing and input shaft 42 of front transaxle 10, includes a first propeller shaft 74, a second propeller shaft 75 and a third propeller shaft 76. First propeller shaft 74 is rotatably integrally connected coaxially to PTO shaft 73 through a coupler 77, and third propeller shaft 76 is rotatably integrally connected coaxially to input shaft 42 through coupler 80 as mentioned above. First and second propeller shafts 74 and 75 are connected to each other through a universal joint 78. Second and third propeller shafts 75 and 76 are connected to each other through a universal joint 79.

PTO shaft 73 supported by the PTO casing is extended in the fore-and-aft direction of vehicle 1 when viewed in plan, and is slanted forwardly downward when viewed in side. Accordingly, first propeller shaft 74 coaxially connected to PTO shaft 73 is also extended forward from PTO shaft 73 in the fore-and-aft direction of vehicle 1 when viewed in plan, and is slanted forwardly downward so as to lower second propeller shaft 75.

Second propeller shaft 75 is horizontally extended along the lower surface of platform 3b so that universal joint 78 and 79 on front and rear ends of second propeller shaft 75 are substantially as high as each other. Second propeller shaft 75 is extended slantwise from rear universal joint 78 to front universal joint 79 when viewed in plan. Universal joint 79 is disposed at the substantially lateral center position in vehicle 1, and third propeller shaft 76 is horizontally extended forward from universal joint 79 in the fore-and-aft direction of vehicle 1 and is coaxially connected to input shaft 42 through coupler 80.

In this way, propeller shafts 75 and 76 are lowered so as to surely lower platform 3b (i.e., a floor at the foot of driver's seat 18), thereby increasing a space above platform 3b in convenience to an operator sitting on seat 18.

The PTO casing according to the first embodiment and a PTO mechanism in the PTO casing will be described with reference to FIGS. 1 to 12. The PTO casing according to the first embodiment, supporting PTO shaft 73 and incorporating PTO gear transmission mechanism 23, is formed by joining a PTO main casing member 82 and a base casing member 81 to each other. PTO main casing member 82 is fixed onto base casing member 81 which is fixed onto an outer surface 96 of PTO support portion 21a. Further, PTO main casing member 82 has a rear opening through which PTO gear transmission mechanism 23 can be assembled into PTO main casing member 82. A lid 122 is normally provided to cover the rear opening of PTO main casing member 82 so as to protect the mechanism in the PTO casing.

To describe the PTO casing, the outer side surface of PTO support portion 21a is defined as the surface toward the PTO casing, i.e., base casing member 81. An inner side surface of base casing member 81 is defined as a surface toward PTO support portion 21a, an outer side surface of base casing member 81 is defined as a surface toward PTO main casing member 82, and an inner side surface of PTO main casing member 82 is defined as a surface toward base casing member 81. Further, fore-and-aft directions of base casing member 81 and PTO main casing member 82 are defined as those on the assumption that the PTO casing is mounted onto transaxle housing 19 so that PTO main casing member 82 supports PTO shaft 73 at the front portion thereof and has the opening at the rear portion thereof provided with lid 122.

Figure 6:
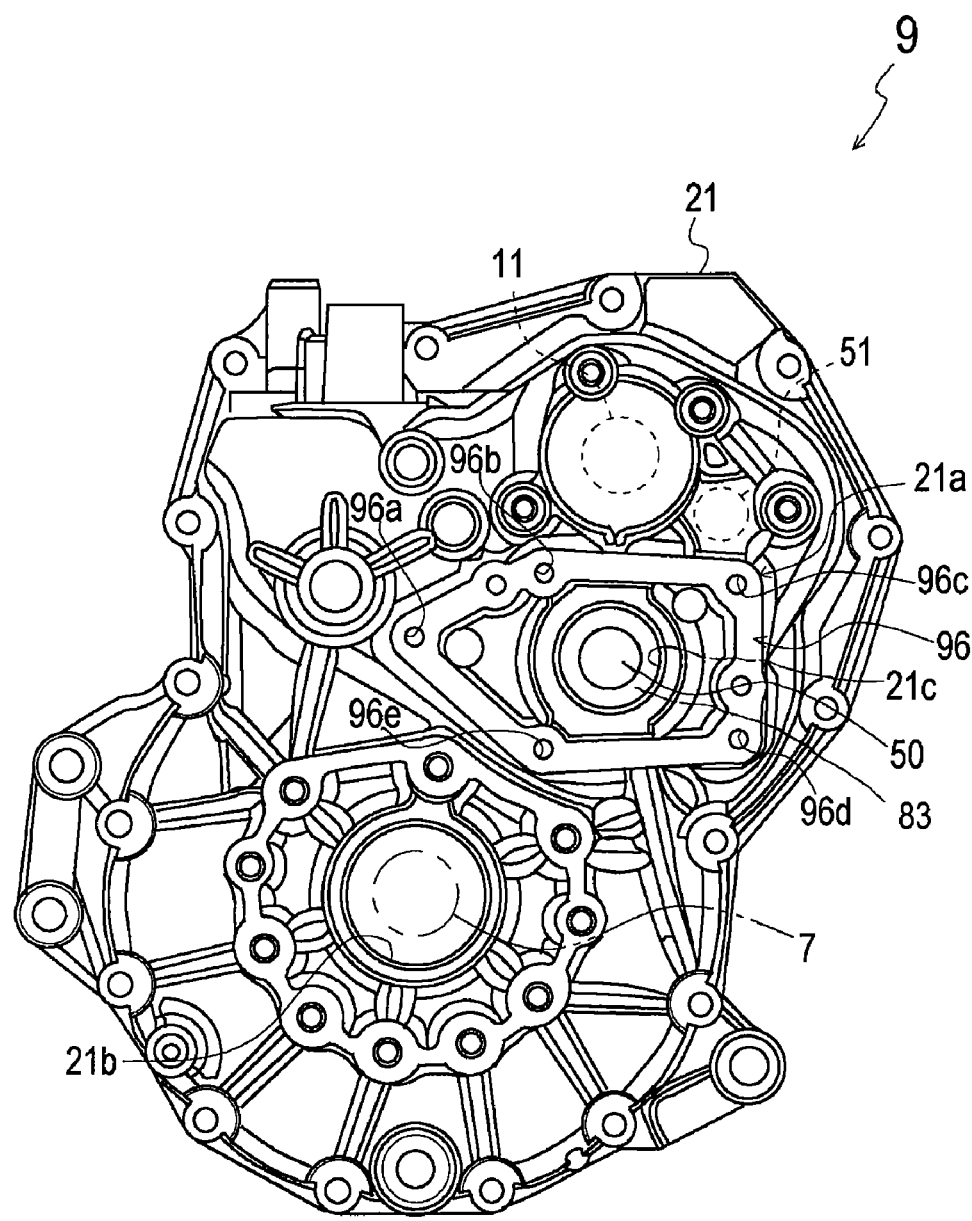
FIG. 6 is a side view of the rear transaxle having the PTO support portion from which the base casing member and the PTO gear casing are removed.
Figure 7:
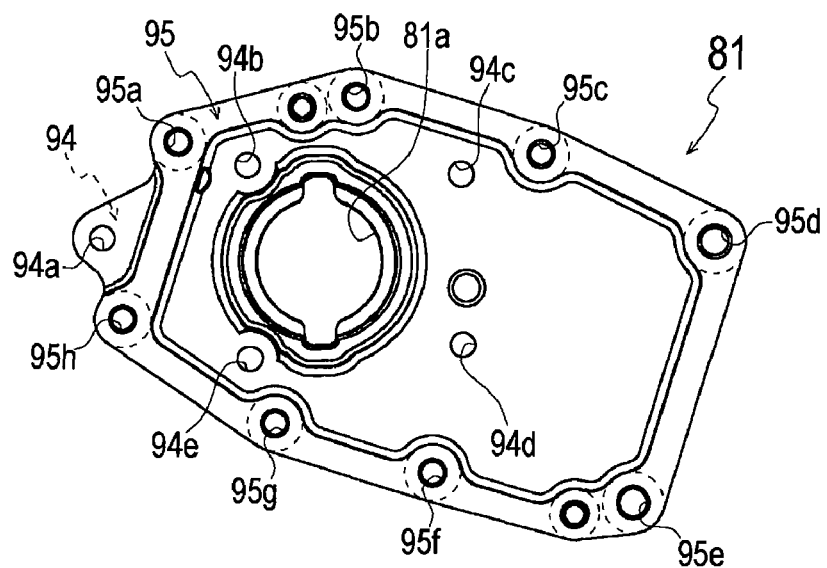
FIG. 7 is an outer side view of the base casing member.
Figure 8:
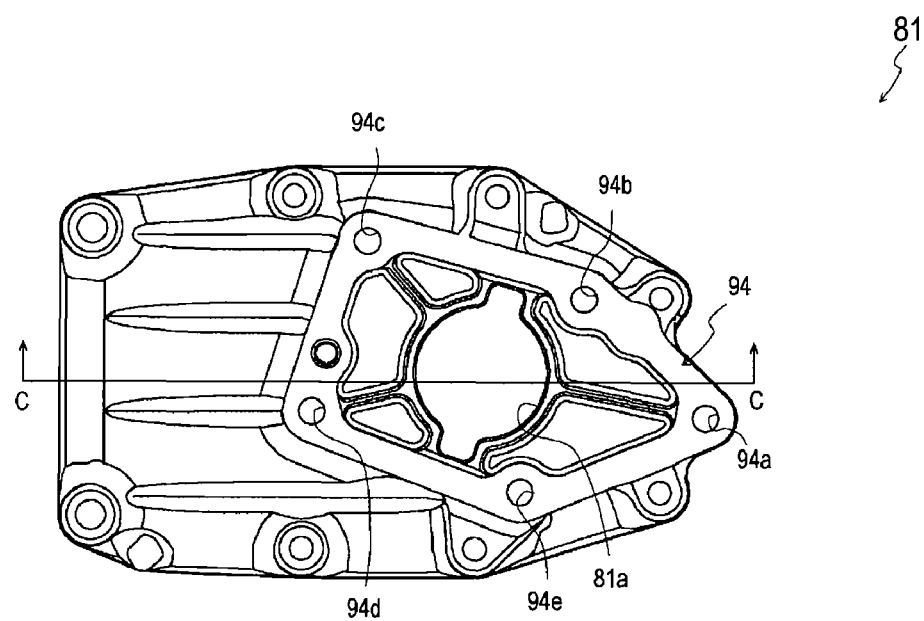
FIG. 8 is an inner side view of the base casing member.
Figure 9:
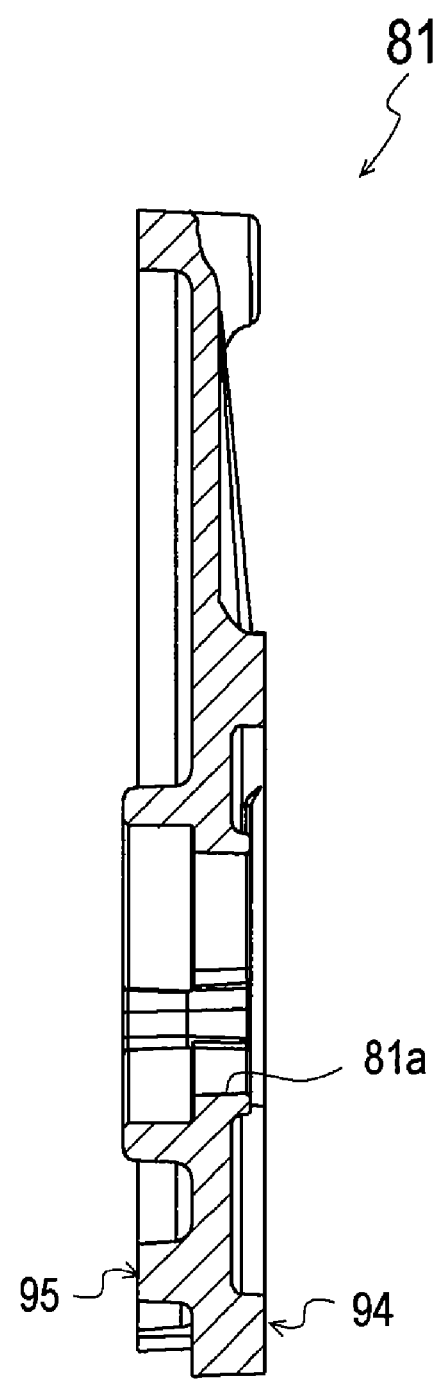
FIG. 9 is a cross sectional view taken along C-C line of FIG. 8.

Base casing member 81 shown in FIGS. 7 to 9 is fixed onto outer surface 96 of PTO support portion 21a as shown in FIGS. 2 to 6, so that a shaft hole 81a bored in a rear portion of base casing member 81 coincides to shaft hole 21c of PTO support portion 21a. Bearing 83 is fitted in shaft hole 21c of PTO support portion 21a and onto counter shaft 50 as mentioned above. A center boss portion 71a of a bevel gear 71 is fixed on a distal end portion of counter shaft 50 projecting outward from bearing 83, and a bearing 85 is fitted in shaft hole 81a of base casing member 81 and onto center boss portion 71a of bevel gear 71. In this way, counter shaft 50 and bevel gear 71 is journalled by bearings 83 and 85.

As shown in FIG. 4, PTO main casing member 82 is formed integrally with a rear boss portion 82a at a fore-and-rear intermediate portion thereof, and with a front boss portion 82b at a front portion thereof. Bearings 89 and 90 are fitted in rear boss portion 82a, and a bearing 91 is fitted in front boss portion 82b. PTO shaft 73 is divided into coaxial shafts that act as PTO clutch input and output shafts 86 and 87, respectively, and a PTO clutch 92 is provided on PTO shaft 73 so as to be interposed between shafts 86 and 87. A center boss portion 72a of a bevel gear 72 is fixed onto a rear end portion of PTO clutch input shaft 86, and bearing 89 is fitted on center boss portion 72a of bevel gear 72. Bevel gear 72 meshes with bevel gear 71. Bearing 90 is fitted on a front end portion of PTO clutch input shaft 86. In this way, PTO clutch input shaft 86 with bevel gear 72 is supported by rear bearing 89 and front bearing 90. Bearing 91 is fitted onto PTO clutch output shaft 87 so as to journal PTO clutch output shaft 90.

PTO clutch input and output shafts 86 and 87 are formed integrally with respective splines 86a and 87a on outer peripheral surfaces of mutually facing end portions thereof. A spline 88a formed on an inner peripheral surface of a clutch slider 88 is engaged with spline 87a on the outer peripheral surface of PTO clutch output shaft 87, so that clutch slider 88 is axially slidably and relatively unrotatably fitted on PTO clutch output shaft 87. Due to the axial sliding of clutch slider 88 along PTO clutch output shaft 87, spline 88a is selectively engaged or disengaged with and from spline 86a of PTO clutch input shaft 86.

Figure 3:
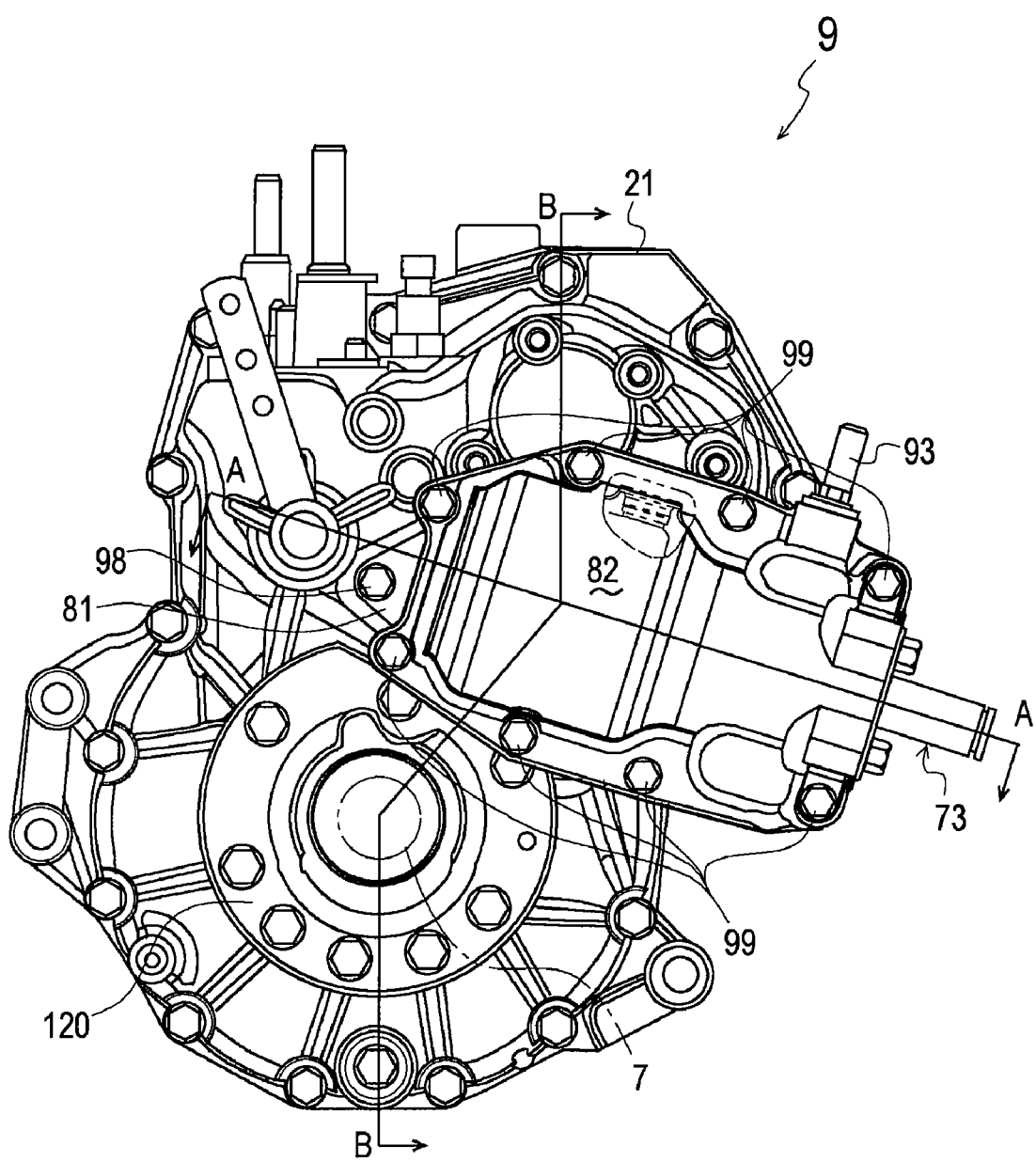
FIG. 3 is a side view of the transaxle formed with a PTO support portion on which a PTO casing, including a base casing member and a PTO main casing member, is mounted to incorporate a PTO gear transmission mechanism, according to a first embodiment.

Clutch slider 88 is operatively to a PTO clutch operation cam pin 93. PTO clutch operation cam pin 93 is axially slidably supported by PTO main casing member 82, and projects outward from PTO main casing member 82 as shown in FIG. 3, so as to be operatively connected to a drive-mode switching operation device (not shown). PTO clutch operation cam pin 93 is provided with a cam in PTO main casing member 82 so as to convert its axial movement (perpendicular to PTO shaft 73) into the axial slide movement of clutch slider 88 along PTO shaft 73.

When the drive-mode switching operation device is set at a four-wheel drive mode position, PTO clutch operation cam pin 93 is operated to slide clutch slider 88 so that spline 88a engaging with spline 87a also engages with spline 86a, thereby engaging PTO clutch 92 to transmit power from rear transaxle 9 to front transaxle 10. Therefore, vehicle 1 travels by driving rear wheels 16 and front wheels 15. When the drive-mode switching operation device is set at a two-wheel drive mode position, clutch slider 88 slides so that spline 88a engaging with spline 87a is disengaged from spline 86a, thereby disengaging PTO clutch 92 to isolate front transaxle 10 from the power taken-off from rear transaxle 9. Therefore, vehicle 1 travels by driving only rear wheels 16.

Alternatively, a clutch replacing PTO clutch 92 serving as the drive mode switching means may be provided on any part on four-wheel driving power transmission system 2. To simplify the link mechanism between PTO clutch operation cam pin 93 and the drive mode switching operation device, PTO clutch operation cam pin 93 may be preferably disposed near front transaxle 10 near driver's seat 18.

The configuration of PTO support portion 21a, base casing member 81 and PTO main casing member 82 such as to mount the PTO casing onto transaxle housing 19 will be described. As shown in FIG. 6, PTO support portion 21a is shaped to have outer side surface 96 which serves an edge surrounding shaft hole 21c when viewed in the axial direction of counter shaft 50. Bolt holes 96a, 96b, 96c, 96d and 96e are opened at outer side surface 96.

As shown in FIGS. 7 and 8, base casing member 81 is shaped to have an inner side surface 94 and an outer side surface 95, which serve as edges surrounding respective apertures. Bolt holes 94a, 94b, 94c, 94d and 94e are opened at inner side surface 94, and bolt holes 95a, 95b, 95c, 95d, 95e, 95f, 95g and 95h are opened at outer side surface 95. When viewed in the axial direction of counter shaft 50, outer side surface 95 is disposed to almost surround inner side surface 94, and only a portion of inner side surface 94 having bolt hole 94a appears projecting outward from outer side surface 95.

When base casing member 81 is fixed to PTO support portion 21a of transaxle housing 19, inner side surface 94 is fitted onto outer side surface 96 so that bolt hole 94a coincides to bolt hole 96a, bolt hole 94b to bolt hole 96b, bolt hole 94c to bolt hole 96c, bolt hole 94d to bolt hole 96d, and bolt hole 94e to bolt hole 96e, respectively. A bolt 98 serving as a fastener is passed through mutually coinciding bolt holes 94a and 96a so as to be screwed into PTO support portion 21a. Similarly, bolts 98 are passed through bolt holes 94b and 96b, bolt holes 94c and 96c, bolt holes 94d and 96d, and bolt holes 94e and 96e, respectively, and are screwed into PTO support portion 21a. In this regard, bolts 98 can be accessed to these bolt holes through the outward aperture surrounded by outer side surface 95 before PTO main casing member 82 is mounted onto base casing member 81. In this way, base casing member 81 is fastened to PTO support portion 21a by bolts 98.

After fastening base casing member 81 to PTO support portion 21a, bearing 85 is fitted into shaft hole 81a, and center boss portion 71a of bevel gear 71 is spline-fitted onto the distal end portion of counter shaft 50, and is fitted into bearing 85 in shaft hole 81a. Then, PTO main casing member 82, in which bevel gear 72, PTO clutch 92 and PTO shaft 73 are previously assembled, is mounted onto base casing member 81. In this regard, an inner side flange surface 97 formed on PTO main casing member 82 is fitted onto outer side surface 95 of base casing member 81 so that bolt hole 97a coincides to bolt hole 95a, bolt hole 97b to bolt hole 95b, bolt hole 97c to bolt hole 95c, bolt hole 97d to bolt hole 95d, bolt hole 97e to bolt hole 95e, bolt hole 97f to bolt hole 95f, bolt hole 97g to bolt hole 95g, and bolt hole 97h to bolt hole 95h. Bolts 99 serving as fasteners are passed through mutually coinciding bolt holes 97a and 95a, bolt holes 97b and 95b, bolt holes 97c and 95c, bolt holes 97d and 95d, bolt holes 97e and 95e, bolt holes 97f and 95f, bolt holes 97g and 95g, and bolt holes 97h and 95h, respectively, so as to be screwed into base casing member 81, thereby completing the PTO casing mounted on transaxle housing 19. Heads of bolts 98 are hidden by PTO main casing member 82 so as not to be exposed.

As understood from FIG. 6, outer side surface 96 includes an upper end portion substantially horizontally extended between bolt holes 96b and 96c, a lower end portion substantially horizontally extended between bolt holes 96d and 96e, and a front end portion substantially vertically extended between bolt holes 96c and 96d. This rectangular-shaped arrangement of the upper, lower and front end portions of outer side surface 96 is essentially provided for convenience to fit to a PTO casing supporting a PTO shaft which projects horizontally forward from the PTO casing. However, as mentioned above referring to FIGS. 1 and 2, vehicle 1 has low platform 3b in front of rear transaxle 9 and engine 6, and propeller shaft 75 must be disposed lower than platform 3b, so that propeller shaft 74 and PTO shaft 73 are required to be extended forwardly downward slantwise.

If a PTO casing is constituted by a single casing member to be directly fitted onto outer side surface 96 of PTO support portion 21a, the single casing member should be formed to support slanted PTO shaft 73 assembled together with the PTO mechanism including PTO gear transmission mechanism 23 and PTO clutch 92. In other words, when there is a possibility to adapt rear transaxle 9 to either a vehicle requiring a horizontal PTO shaft or a vehicle (e.g., vehicle 1) requiring a slanted PTO shaft, two or more type PTO casings into which the same PTO mechanisms are assembled must be prepared, thereby complicating the processing of PTO casings, and increasing costs.

Figure 10:
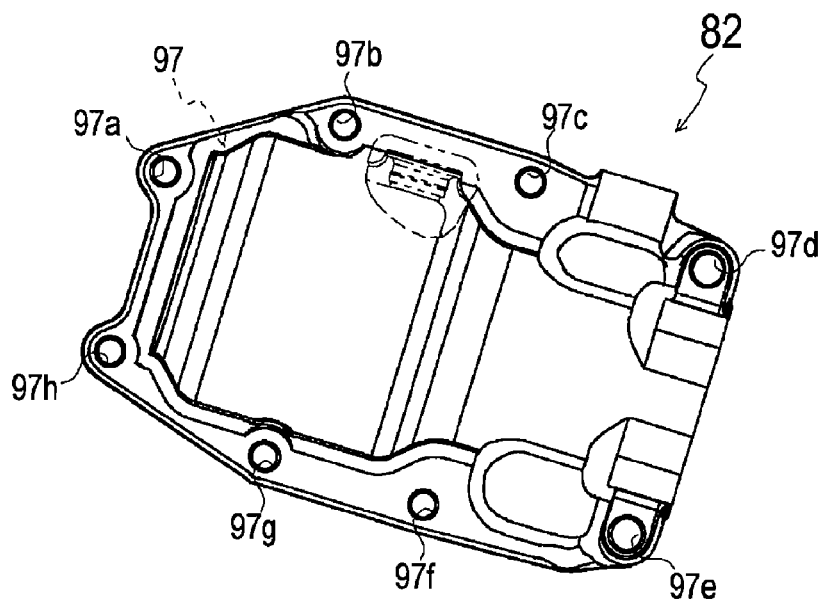
FIG. 10 is an outer side view of the PTO main casing member.
Figure 11:
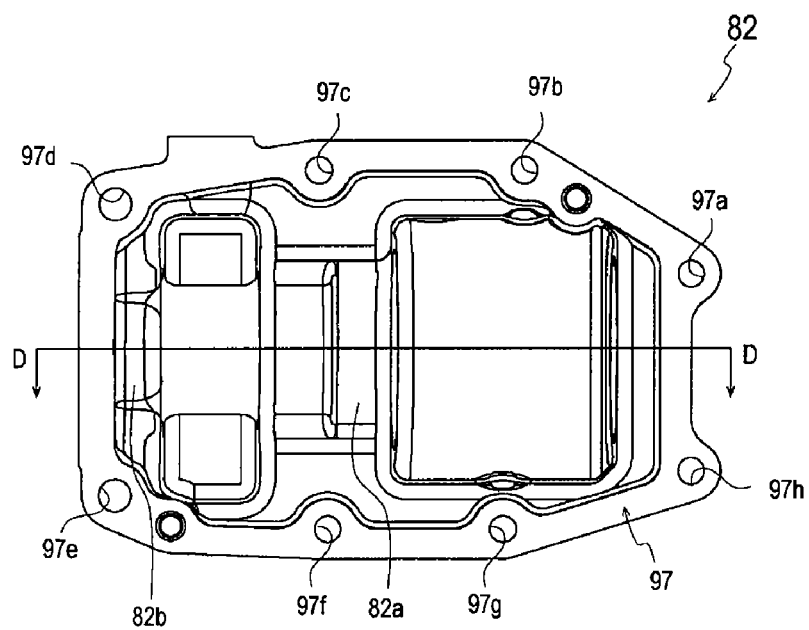
FIG. 11 is an inner side view of the PTO main casing member.
Figure 12:
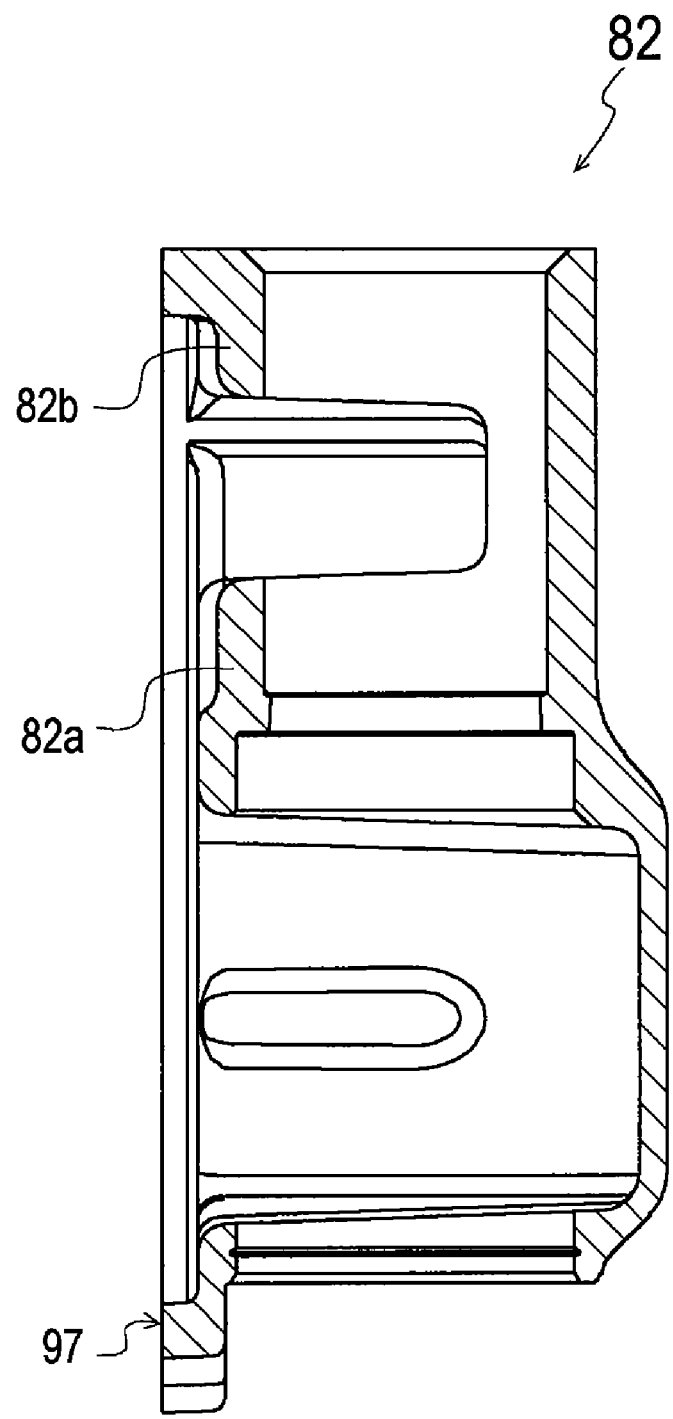
FIG. 12 is a cross sectional view taken along D-D line of FIG. 11.

However, the PTO casing of this embodiment is divided into base casing member 81 and PTO main casing member 82. As shown in FIGS. 10 to 12, in comparison with base casing member 81, PTO main casing member 82 is large and has a complex shape such as to have the PTO mechanism including PTO gear transmission mechanism 23, PTO clutch 92 and PTO shaft 73 assembled therein. Inner side flange surface 97 includes an upper end portion extended between bolt holes 97b and 97d and a lower end portion extended between bolt holes 97e and 97g. The upper and lower end portions of inner side flange surface 97 are adapted to be disposed above and below PTO shaft 73 in parallel. Inner side flange surface 97 is cut off at a front end thereof between bolt holes 97d and 97e so as to ensure a front end opening of PTO main casing member 82 through which PTO shaft 73 (i.e., PTO clutch output shaft 87) projects outward.

As shown in FIGS. 7 to 9, in comparison with PTO main casing member 82 supporting the main part of the PTO mechanism, base casing member 81 is small and simple because it supports only counter shaft 50 and bevel gear 71. While inner side surface 94 is shaped to fit outer side surface 96 of PTO support portion 21a shaped to support a horizontal PTO shaft as mentioned above, outer side surface 95 is shaped to include an upper end portion extended forwardly downward slantwise between bolt holes 95b and 95d and a lower end portion extended forwardly downward slantwise between bolt holes 95e and 95g. As a result, when PTO main casing member 82 supporting the PTO mechanism including PTO shaft 73 is mounted on base casing member 81 by fitting inner side flange surface 97 onto outer side surface 95, PTO shaft 73 supported by PTO main casing member 82 is extended forwardly downward slantwise.

In other words, since base casing member 81 is shaped so that the extension direction of the upper and lower end portions of outer side surface 95 for fitting PTO main casing member 82 is different from the extension direction of the upper and lower end portions of inner side surface 94 for fitting PTO support portion 21a, the projection direction of PTO shaft 73 supported by PTO main casing member 82 fitted on base casing member 81 is not horizontal while PTO support portion 21a is shaped to support a PTO casing having a horizontal PTO shaft. When transaxle 9 is provided to a vehicle requiring a horizontal PTO shaft, an alternative base casing member having a different shape is provided. An outer side surface of this alternative base casing member is shaped so that PTO shaft 73 supported by the same PTO main casing member 82 fitted thereto becomes horizontal.

Therefore, when there is a possibility to adapt transaxle 9 to either a vehicle requiring a horizontal PTO shaft or a vehicle (e.g., vehicle 1) requiring a slanted PTO shaft, two or more type base casing members, including base casing member 81, must be prepared. However, the base casing member is small and simple to be easily and inexpensively manufactured. On the other hand, the same PTO main casing member 82 is provided regardless whether PTO shaft 73 is required to be horizontal or not. In this way, the main part of the PTO casing supporting the PTO mechanism can be standardized and only the simple and small base casing member is substitutable, thereby reducing costs.

Figure 13:
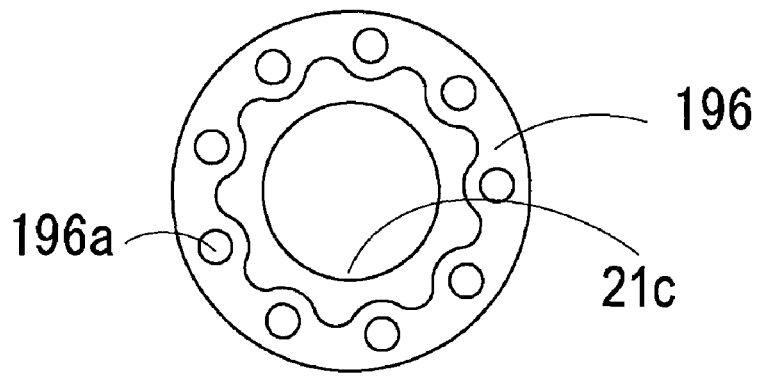
FIG. 13 is an outer side view of an outer surface of the PTO support portion of the transaxle housing according to a second embodiment.
Figure 14:
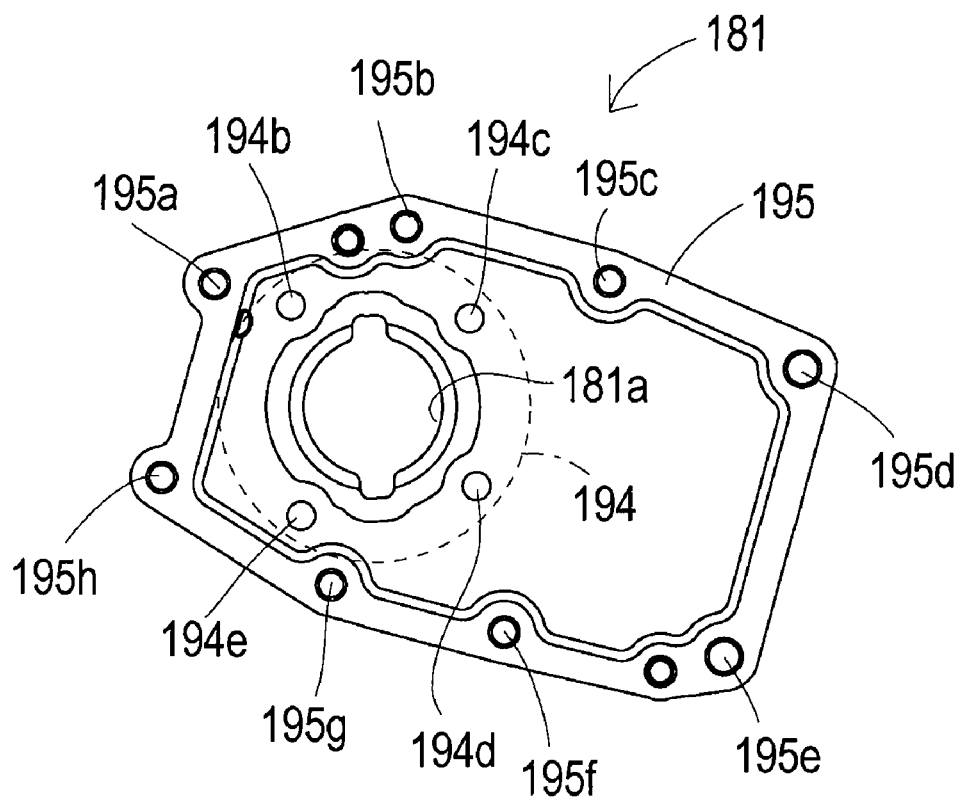
FIG. 14 is an outer side view of a base casing member corresponding to the outer surface of the PTO support portion shown in FIG. 13 according to the second embodiment.

A second embodiment shown in FIGS. 13 and 14 will be described. PTO support portion 21a has an alternative annular outer side surface 196 surrounding shaft hole 21c, and bolt holes 196a are opened at regular intervals on outer side surface 196. A base casing member 181 is interposed between outer side surface 196 of PTO support portion 21a and inner side flange surface 97 of the same PTO main casing member 82 as that of the first embodiment. Base casing member 181 is formed with an inner side surface 194 to fit outer side surface 196, and with an outer side surface 195 to fit inner side flange surface 97 of PTO main casing member 82. Bolt holes 195a, 195b, 195c, 195d, 195e, 195f, 195g and 195h are arranged in outer side surface 195 to coincide to respective bolt holes 97a, 97b, 97c, 97d, 97e, 97f, 97g and 97h, similar to bolt holes in outer side surface 95 of base casing member 81.

On the other hand, inner side surface 194 is formed annularly to surround a shaft hole 181a to coincide to shaft hole 21c, and bolt holes 194b, 194c, 194d and 194e are provided in inner side surface 194. Bolt holes 196a in outer side surface 195 are more in number than bolt holes 194b, 194c, 194d and 194e, so that four of all bolt holes 196a are optionally selected to correspond to bolt holes 194b, 194c, 194d and 194e. In this way, in the second embodiment, the projection direction of PTO shaft 73 supported by PTO main casing member 82 relative to PTO support portion 21a is selected depending on which bolt holes 196a are selected to coincide to bolt holes 194b, 194c, 194d and 194e, so as to pass bolts 98 therethrough. The selection of bolt holes 196a to coincide to bolt holes 194b, 194c, 194d and 194e depends on change of the rotational position of base casing member 181 centered on the axis of counter shaft 50.

Therefore, in the second embodiment, only standardized base casing member 181 can be used as the base casing member interposed between PTO support portion 21a and PTO main casing member 82, so as to ensure variation of projection direction of PTO shaft 73 supported by PTO main casing member 82 in relative to transaxle 9, thereby reducing costs. On the contrary, in the above-mentioned first embodiment, another type base casing member must be prepared in addition to illustrated base casing member 81 to ensure variation of projection direction of PTO shaft 73 supported by PTO main casing member 82 in relative to transaxle 9.

Figure 15:
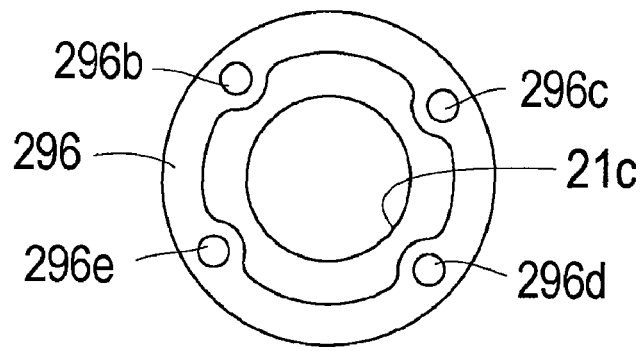
FIG. 15 is an outer side view of an outer surface of the PTO support portion of the transaxle housing according to a third embodiment.
Figure 16:
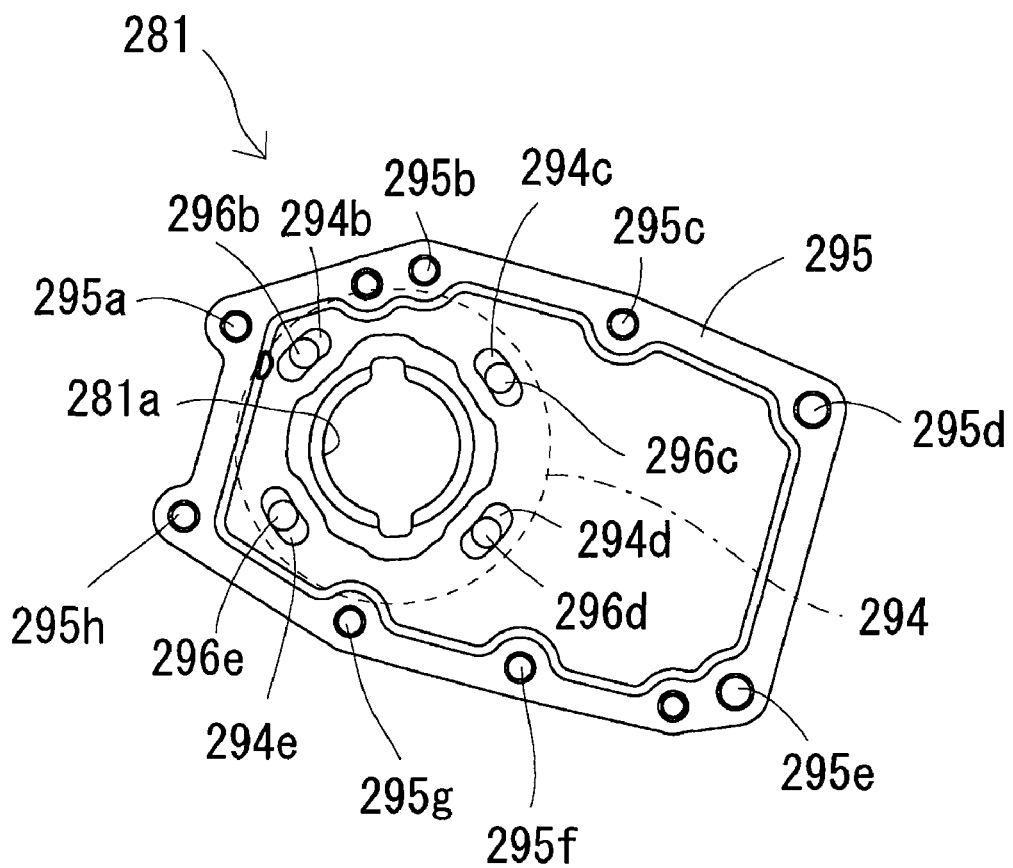
FIG. 16 is an outer side view of a base casing member corresponding to the outer surface of the PTO support portion shown in FIG. 15 according to the third embodiment.

A third embodiment shown in FIGS. 15 and 16 will be described. PTO support portion 21a has an alternative annular outer side surface 296 surrounding shaft hole 21c, and four bolt holes 296b, 296c, 296d and 296e are opened on outer side surface 296. A base casing member 281 is interposed between outer side surface 296 of PTO support portion 21a and inner side flange surface 97 of the same PTO main casing member 82 as that of the first embodiment. Base casing member 281 is formed with an inner side surface 294 to fit outer side surface 296, and with an outer side surface 295 to fit inner side flange surface 97 of PTO main casing member 82. Bolt holes 295a, 295b, 295c, 295d, 295e, 295f, 295g and 295h are arranged in outer side surface 295 to coincide to respective bolt holes 97a, 97b, 97c, 97d, 97e, 97f, 97g and 97h, similar to bolt holes in outer side surface 95 of base casing member 81.

On the other hand, inner side surface 294 is formed annularly to surround a shaft hole 281a to coincide to shaft hole 21c, and four bolt slots 294b, 294c, 294d and 294e are provided in inner side surface 294. Bolt slots 294b, 294c, 294d and 294e are elongated in the circular direction centered on the axis of counter shaft 50. In the third embodiment, inner side surface 294 of base casing member 281 is fitted to outer side surface 296 of PTO support portion 21*a*, and bolt hole 294*b* coincides to bolt hole 296*b*, bolt hole 294*c* to bolt hole 296*c*, bolt hole 294*d* to bolt hole 296*d*, and bolt hole 294*e* to bolt hole 296*e*, respectively, so as to pass bolts 98 therethrough. The projection direction of PTO shaft 73 supported by PTO main casing member 82 relative to PTO support portion 21*a* can be changed by changing the rotational position of base casing member 281 relative to outer side surface 296 of PTO support portion 21*a* so as to change the positions in respective bolt slots 294*b*, 294*c*, 294*d* and 294*e* to coincide to respective bolt holes 296*b*, 296*c*, 296*d* and 296*e*. For example, the position in bolt slot 294*b* coinciding to bolt hole 296*b* is shifted from an end portion of bolt slot 294*b* to a center portion of bolt slot 294*b*, and the positions in other bolt slots 294*c*, 294*d* and 294*e* coinciding to respective bolt holes 296*c*, 296*d* and 296*e* are shifted in the same way, thereby changing the relative rotational position of base casing member 281 to outer side surface 296.

In this way, in the third embodiment, only standardized base casing member 281 can be used as the base casing member interposed between PTO support portion 21*a* and PTO main casing member 82, so as to ensure variation of projection direction of PTO shaft 73 supported by PTO main casing member 82 in relative to transaxle 9, thereby reducing costs. Further, in comparison with the second embodiment, four bolt holes 296*b*, 296*c*, 296*d* and 296*e* in outer side surface 296 of PTO support portion 21*a* are less than bolt holes 196*a* in outer side surface 196 of PTO support portion 21*a*, thereby reducing the processing of housing half 21, and reducing costs.

Figure 17:
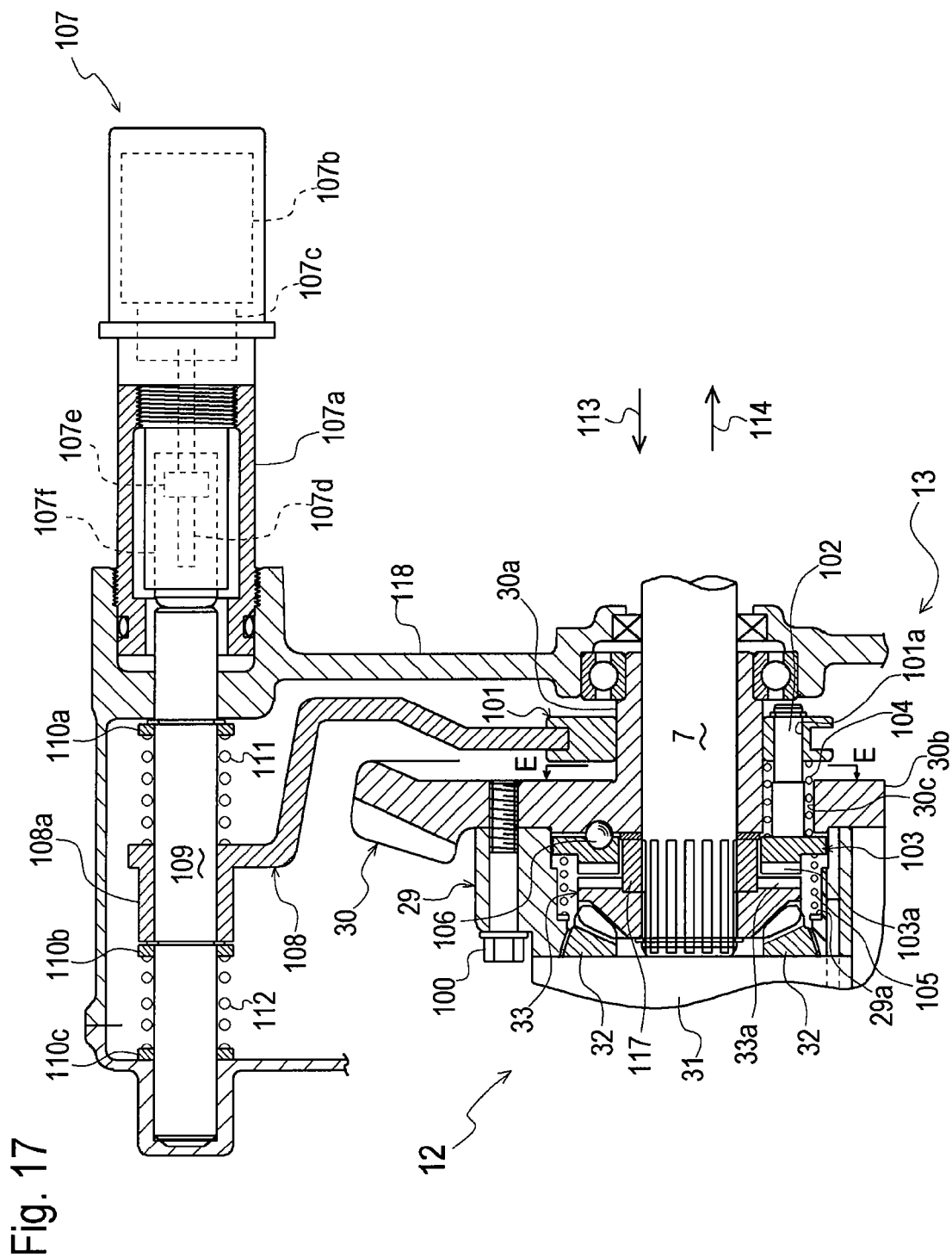
FIG. 17 is a fragmentary sectional front view of the transaxle provided with another differential gear unit and another different lock mechanism.

An alternative differential gear unit 12 with a differential lock mechanism 13 for rear transaxle 9 will be described with reference to FIGS. 17 to 21. As shown in FIG. 17, differential gear unit 12 includes a differential casing 29 and a bevel input gear 30 fixed to one axial end of differential casing 29 by bolts 100. Input gear 30 meshes with a bevel gear corresponding to output gear 60 fixed on counter shaft 50. A pinion shaft 31 is integrally rotatably supported in differential casing 29, and bevel pinions 32 are pivoted on pinion shaft 31 in differential casing 29. Right and left rear differential output shafts 7 are inserted at proximal ends thereof into differential casing 29. Differential side gears 33 are fixed on the proximal ends of respective rear differential output shafts 7, and mesh with pinions 32, thereby differentially connecting right and left differential output shafts 7 to each other.

Figure 18:
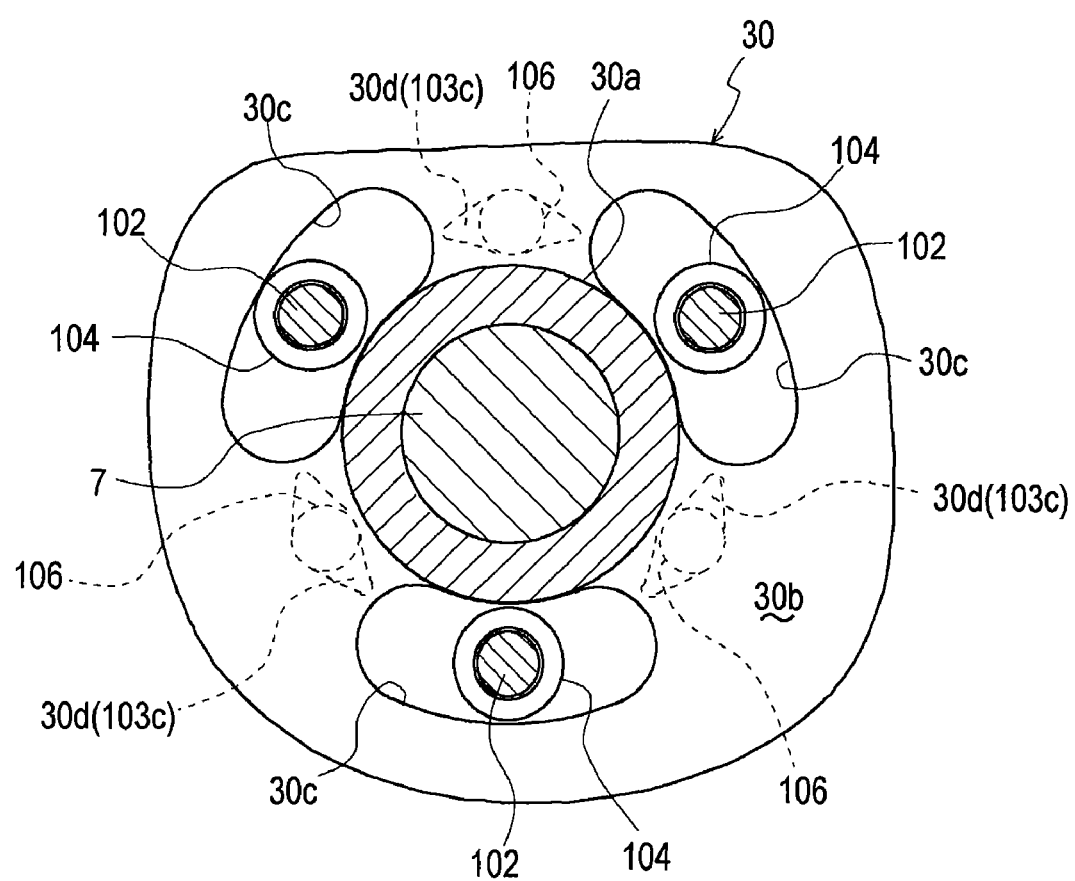
FIG. 18 is a fragmentary sectional side view of the differential gear unit and the differential lock mechanism shown in FIG. 17 when viewed in the axial direction of a different output shaft.

Differential lock mechanism 13 includes a differential lock slider 101 axially slidably and relatively unrotatably fitted on a central boss portion 30*a* of input gear 30. Lock pins 102 (in this embodiment, three lock pins 102) are passed at one ends thereof through differential lock slider 101, and are passed at the other ends thereof into differential casing 29 through respective slots 30*c* penetrating a main plate portion 30*b* of input gear 30 around central boss portion 30*a*. As shown in FIG. 18, slots 30*c* are curved and extended in the circular direction centered on the axis of differential output shaft 7.

In differential casing 29, a guide collar 117 is spline-fitted on differential output shaft 7 between differential side gear 33 and input gear 30, and a clutch disc 103 is axially slidably and relatively rotatably fitted on guide collar 117. The proximal ends of lock pins 102 abut against clutch disc 103, and springs 104 are wound around respective lock pins 102 through respective slots 30*c* between differential lock slider 101 and clutch disc 103. Each of lock pins 102 is fixedly provided with a stopper ring 102*a* on a distal end thereof projecting outward from differential lock slider 101 opposite to differential casing 29, so as to restrict the inward slide of lock pins 102 relative to differential lock slider 101 (or the outward slide of differential lock slider 101 relative to lock pins 102). When differential lock slider 101 slides in an arrowed direction 113, springs 104 are compressed to bias clutch disc 103 toward differential side gear 33.

Figure 19:
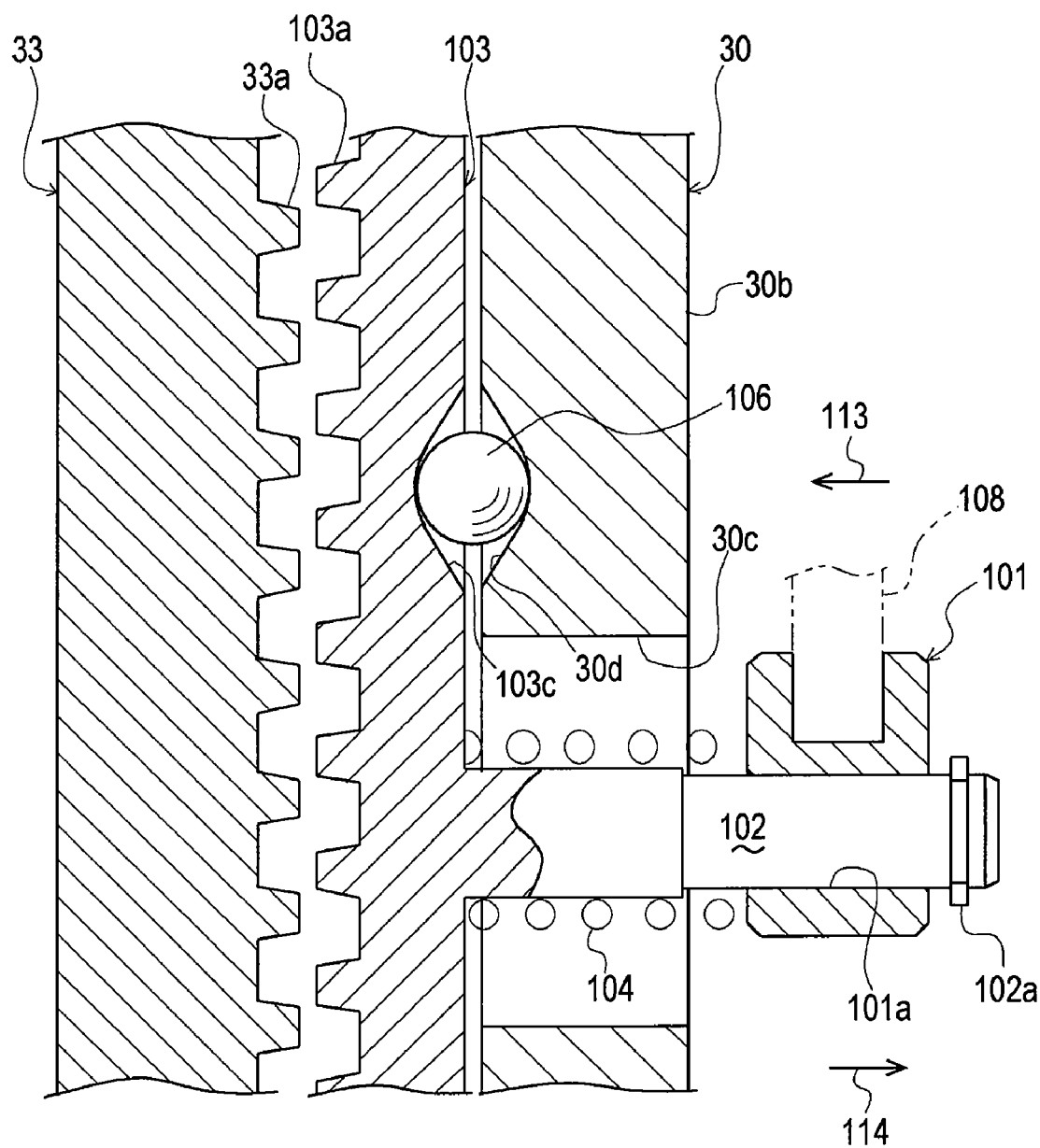
FIG. 19 is a fragmentary sectional front view of the differential gear unit and the differential lock mechanism shown in FIG. 17 when the differential lock mechanism is set for unlocking.

As shown in FIGS. 17 and 19, clutch disc 103 is formed at a proximal end side surface thereof with clutch-teeth 103*a*, and differential side gear 33 is formed with clutch-teeth 33*a* at a distal end side surface thereof facing clutch-teeth 103*a* of clutch disc 103. A spring retainer 29*a* is fixed on an inner peripheral surface of differential casing 29, and a compressed spring 105 is interposed between spring retainer 29*a* and clutch disc 103 so as to bias clutch disc 103 away from differential side gear 33 against the force of springs 104. Essentially, the force of spring 105 overcomes the force of springs 104 so as to separate clutch-teeth 103*a* from clutch-teeth 33*a*.

A cam mechanism is interposed between clutch dick 103 and input gear 30. Recesses 103*c* are opened on the distal side surface of clutch disc 103 toward input gear 30 so as to be arranged at regular intervals around guide collar 117. Recesses 30*d* corresponding to respective recesses 103*c* are opened on the proximal side surface of input gear 30 toward clutch disc 103 so as to be arranged at regular intervals around differential output shaft 7. Each of recesses 103*c* and 30*d* is rhombic having opposite ends in the circular direction centered on the axis of differential output shaft 7 when viewed in the axial direction of differential output shaft 7. Each of recesses 103*c* and 30*d* is bowl-shaped in section so that it is shallowest at the opposite ends, is deepest at a center portion thereof and becomes gradually shallower from the center portion toward the opposite ends. A ball 106 is fittingly provided between each pair of recesses 103*c* and 30*d* corresponding to each other. Such a ball type cam mechanism is advantageous in reduction of frictional resistance, however, another type cam mechanism, such as a simple type using projections, may be interposed between clutch disc 103 and input gear 30.

A fork 108 is fitted at one end thereof on differential lock slider 101. Fork 108 is formed at the other end thereof with a boss 108*a*, and boss 108*a* is fitted on a fork shaft 109 axially slidably supported by a transaxle housing 118 of rear transaxle 9 according to this embodiment. A push-pull type actuator 107 is mounted on an outer side surface of transaxle housing 118 so as to be coaxially extended from an axial end of fork shaft 109.

Actuator 107 includes a casing 107*a* screwed at a proximal end thereof into a wall of transaxle housing 118 and cantilevered from transaxle housing 118, and an electric motor 107*b* is disposed in a distal end portion of casing 107*a*. An output shaft of motor 107*b* is connected to a threaded shaft 107*d* through an acceleration (planetary) gear mechanism 107*c*. Threaded shaft 107*d* is coaxially extended toward fork shaft 109, and a nut 107*e* is screwed on threaded shaft 107*d* and is relatively unrotatably and axially unslidably engaged to a piston 107*f* abutting against the axial end of fork shaft 109. When a controller (not shown) commands motor 107*b* to rotate, the rotation of motor 107*b* is accelerated by acceleration gear mechanism 107*c*, and rotates threaded shaft 107*d* with nut 107*e*. The rotation of nut 107*e* is converted into the axial linear movement of piston 107*f*.

A spring retainer ring 110*a* is fixed on fork shaft 109 adjacent to a wall portion of transaxle housing 118 supporting one axial end portion of fork shaft 109 abutting against actuator 107, and a compressed spring 111 is wound around fork shaft 109 and is interposed between spring retainer ring 110*a* and one end surface of boss 108*a* of fork 108. A spring retainer ring 110*b* is fixed on fork shaft 109 adjacent to the other end surface of boss 108a, a spring retainer ring 110c is axially slidably fitted on fork shaft 109 adjacent to a wall portion of transaxle housing 118 supporting the other axial end portion of fork shaft 109, and a compressed spring 112 is wound around fork shaft 109 and is interposed between spring retainer rings 110b and 110c.

A differential lock operation device (not shown) such as a switch is provided on vehicle 1. When the differential lock operation device is operated for differential lock, the controller issues a differential lock command signal so as to rotate motor 107b for sliding piston 107f in arrowed direction 113 as shown in FIGS. 17 and 19. Fork shaft 109 is pushed by piston 107f so that spring retainer ring 110a fixed on fork shaft 109 pushes boss 108a in arrowed direction 113 through spring 111. Accordingly, as shown in FIG. 19, differential lock slider 101 slides along lock pins 102 in arrowed direction 113 so as to be separated from stopper rings 102a of lock pins 102 and to compress springs 104. This state is referred to a beginning state of pushing operation.

Figure 20:
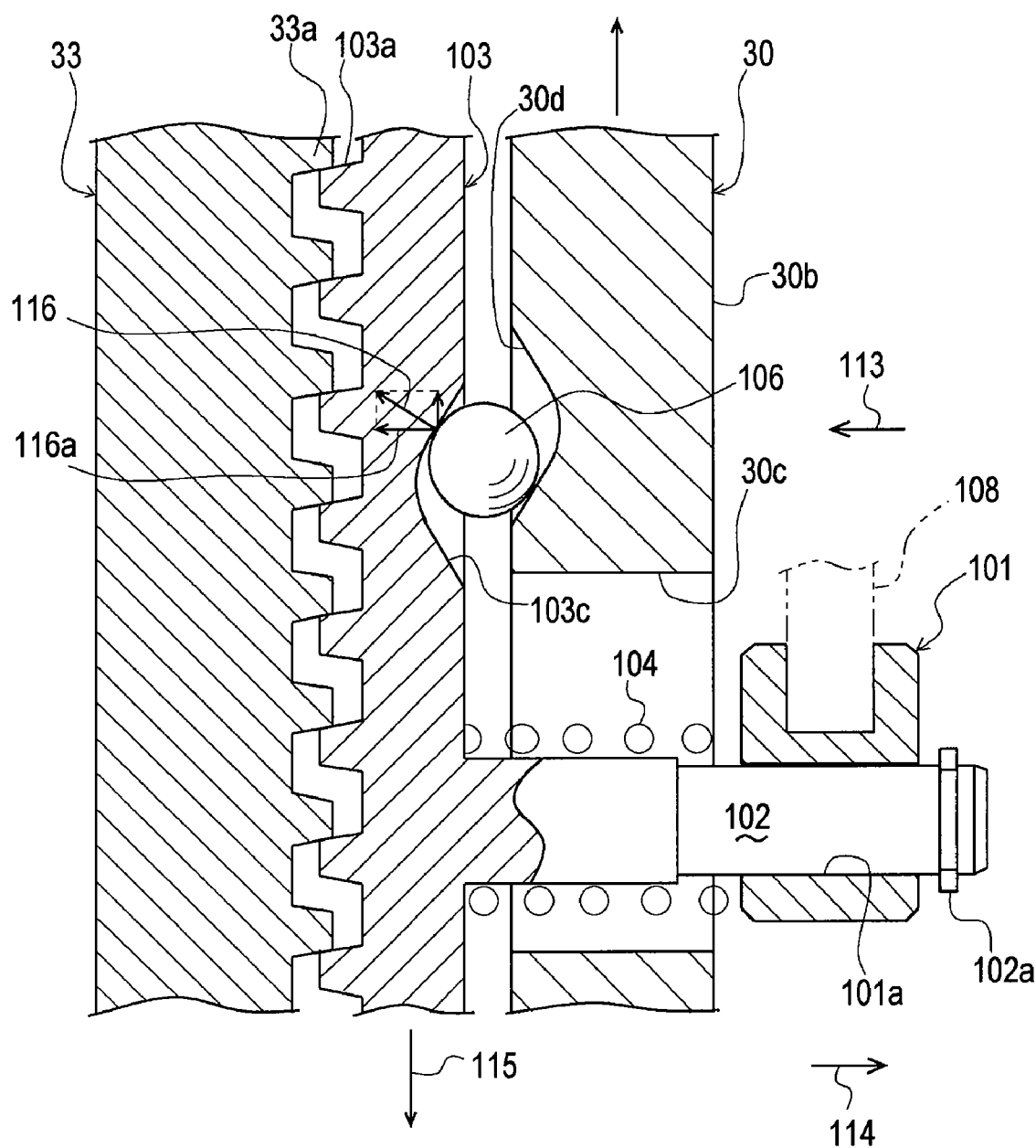
FIG. 20 is a fragmentary sectional front view of the differential gear unit and the differential lock mechanism shown in FIG. 17 showing the midway of actuation of the differential lock mechanism for differential locking.

Compressed springs 104 are decompressed to push clutch disc 103 toward differential side gear 33. Due to the decompression of springs 104, clutch disc 103 moves toward differential side gear 33 so that clutch-teeth 103a partly engage with clutch-teeth 33a as shown in FIG. 20. This state is referred to as a partial clutch engagement state.

In the partial clutch engagement state as shown in FIG. 20, as soon as clutch-teeth 103a partly engage with clutch-teeth 33a, clutch disc 103 is rotated by rotating differential side gear 33 in an arrowed direction 115, thereby causing a relative rotation of clutch disc 103 to input gear 30. Accordingly, mutually corresponding recesses 103c and 30d slip away from each other, so that the portions of recesses 103c and 30d abutting against respective balls 106 become shallower. In this state, each of balls 106 applies a horizontal component force 116a onto clutch disc 103 so as to forcibly push clutch disc 103 toward differential side gear 33. Finally, clutch disc 103 pushed by balls 106 reaches a complete clutch engagement position where clutch-teeth 30a completely engage with clutch-teeth 103a as shown in FIG. 21.

In this way, due to the cam mechanism between clutch disc 103 and input gear 30 constructed considering the difference of rotational position between input gear 30 and differential side gear 33, and due to spring 111 on fork shaft 109, clutch disc 103 can quickly engage with differential side gear 33, i.e., the differential lock activation of differential lock mechanism 13 can be quickly completed. Further, the slide stroke of fork 108 and differential lock slider 101 can be reduced.

Figure 21:
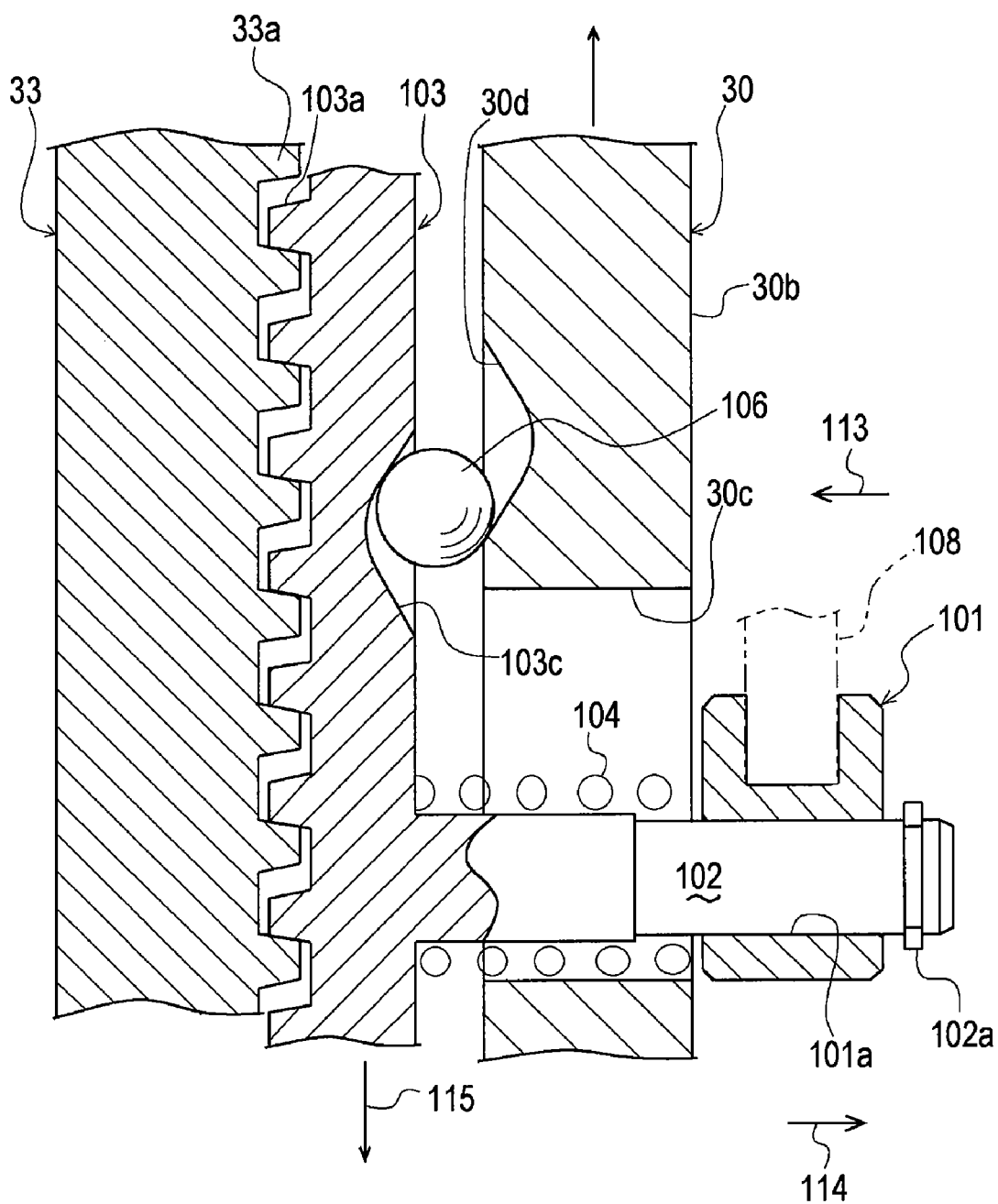
FIG. 21 is a fragmentary sectional front view of the differential gear unit and the differential lock mechanism shown in FIG. 17 when the differential lock mechanism is completely set for differential locking.

When the differential lock operation device is operated for unlocking, the controller issues an unlocking command signal so as to rotate motor 107b for sliding piston 107f in an arrowed direction 114 as shown in FIG. 21. Spring 112 is decompressed so as to push boss 108a of fork 108 through spring retainer ring 110b, and to move fork shaft 109 together with piston 107f sliding in arrowed direction 114, until spring retainer ring 110a fixed on fork shaft 109 comes to abut against the wall portion of transaxle housing 118. Accordingly, during sliding of differential lock slider 101 in arrowed direction 114, differential lock slider 101 slides along lock pins 102, and abuts against stopper rings 102a of lock pins 102, and then, lock pins 102 slides together with differential lock slider 101, so that spring 105 is decompressed so as to quickly return clutch disc 103 toward input gear 30, and to disengage clutch disc 103 from differential side gear 33. In this way, the unlocking activation of differential lock mechanism 13 can be quickly completed.

It is further understood by those skilled in the art that the foregoing description is a preferred embodiment of the disclosed apparatus and that various changes and modifications may be made in the invention without departing from the scope thereof defined by the following claims.

What is claimed is:

1. A transaxle comprising:
   a transaxle housing incorporating a transmission for driving an axle;
   a power take-off support portion formed on the transaxle housing, the power take-off support portion including a shaft hole and an outer side surface formed around the shaft hole, wherein the outer side surface of the power take-off support portion is shaped to fit a power take-off casing supporting a power take-off shaft in a first direction;
   a shaft of the transmission projecting outward from the shaft hole; and
   a power take-off casing including a power take-off main casing member and a base casing member joined to each other,
   wherein the power take-off main casing member is assembled therein with a power take-off shaft and a power take-off transmission mechanism drivingly connected to the power take-off shaft,
   wherein the base casing member is interposed between the power take-off support portion and the power take-off main casing member so as to pass through the shaft projecting from the shaft hole and to drivingly connect an end of the shaft to the power take-off transmission mechanism in the power take-off main casing member,
   wherein the base casing member is formed with an inner side surface for fitting the outer side surface of the power take-off support portion, and with an outer side surface for fitting an inner side surface of the power take-off main casing member, and
   wherein the inner side surface and the outer side surface of the base casing member are shaped so that the power take-off shaft supported by the power take-off main casing member is oriented in a second direction different from the first direction when the inner side surface of the base casing member is fitted to the outer side surface of the power take-off support portion, and the outer side surface of the base casing member is fitted to the inner side surface of the power take-off main casing member.

2. The transaxle according to claim 1, wherein the first direction is horizontal, and the second direction is slanted with respect to the horizontal direction.

3. The transaxle according to claim 1, wherein one or more holes opened on the outer side surface of the power take-off support portion are coincided to one or more holes opened on the inner side surface of the base casing member respectively, and one or more fasteners are passed through the mutually coinciding holes respectively, so as to fasten the base casing member to the power take-off support portion.

4. The transaxle according to claim 3, wherein the one or more fasteners are hidden by the power take-off main casing member so as not to be exposed when the power take-off main casing member is mounted to the base casing member by fitting the inner side surface of the power take-off casing member to the outer side surface of the base casing member.

5. The transaxle according to claim 1, wherein the power take-off transmission mechanism includes mutually meshing first and second gears, the base casing member supports the first gear, and the power take-off main casing member supports the second gear so that the second gear meshes with the first gear when the power take-off main casing member is mounted on the base casing member by fitting the inner side surface of the power take-off main casing member to the outer side surface of the base casing member.

6. A vehicle equipped with the transaxle according to claim 1, wherein the transaxle is provided with an input part of the transmission therein on a surface of the transaxle housing opposite to the side surface formed with the power take-off support portion, so that the input part of the transmission in the transaxle housing is drivingly connected to a prime mover output part on one side of a prime mover through another transmission upstream of the transmission in the transaxle housing, and wherein a power train is extended from the power take-off shaft on the other side of the prime mover.

7. The vehicle according to claim 6, wherein a second transaxle is disposed opposite to the transaxle with respect to the prime mover, wherein the power train is drivingly connected to an input part of the second transaxle.

\* \* \* \* \*